US008670444B2

(12) United States Patent
Kizawa et al.

(10) Patent No.: US 8,670,444 B2
(45) Date of Patent: Mar. 11, 2014

(54) NETWORK SYSTEM AND NETWORK APPARATUS

(75) Inventors: Masao Kizawa, Yokohama (JP); Masaya Arai, Atsugi (JP); Shinji Nozaki, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 258 days.

(21) Appl. No.: 13/116,406

(22) Filed: May 26, 2011

(65) Prior Publication Data

US 2011/0292931 A1 Dec. 1, 2011

(30) Foreign Application Priority Data

May 27, 2010 (JP) ................................. 2010-121874

(51) Int. Cl.
*H04L 12/66* (2006.01)
(52) U.S. Cl.
USPC ........... 370/354; 370/219; 370/225; 370/235; 370/392; 370/409; 709/231; 709/238
(58) Field of Classification Search
USPC ......... 370/219, 225, 235, 351, 354, 392, 409; 709/231, 238
See application file for complete search history.

(56) References Cited

U.S. PATENT DOCUMENTS

2007/0183313 A1* 8/2007 Narayanan et al. ............ 370/216
2008/0049778 A1* 2/2008 Yano et al. ..................... 370/422

OTHER PUBLICATIONS

Cisco Systems, Inc. "CISCO Catalyst 6500 Series Virtual Switching System (VSS) 1440," White Paper, pp. 1-62, San Jose, CA (2010).

* cited by examiner

*Primary Examiner* — Ayaz Sheikh
*Assistant Examiner* — Nicholas Sloms
(74) *Attorney, Agent, or Firm* — Volpe and Koenig, P.C.

(57) ABSTRACT

In a virtual network apparatus, even when a fault occurs on a private line connecting plural physical network apparatuses to communicate a control signal, the redundancy is maintained, and the lower forwarding capability is prevented. In this network system, a control signal for virtualization to be transmitted and received between plural physical network apparatuses is relayed via a unit spanning LA connecting each physical network apparatus and an adjacent network apparatus in the adjacent network apparatus. Thereby, even when a fault occurs in the private line, it is possible to continue to communicate the control signal between the physical network apparatuses and continuously operate the virtual network apparatus.

12 Claims, 37 Drawing Sheets

TABLE THAT UNIT-TO-UNIT DATA
FORWARDING SECTION 108 OF
PHYSICAL UNIT 101 HOLDS

| KIND OF STATE | STATE |
|---|---|
| SYSTEM STATE OF SELF-UNIT | ACTIVE |
| UNIT-TO-UNIT LINK STATE | NORMAL |

Fig. 10A

TABLE THAT UNIT-TO-UNIT DATA
FORWARDING SECTION 108 OF
PHYSICAL UNIT 102 HOLDS

| KIND OF STATE | STATE |
|---|---|
| SYSTEM STATE OF SELF-UNIT | STANDBY |
| UNIT-TO-UNIT LINK STATE | NORMAL |

Fig. 10B

TABLE THAT UNIT-TO-UNIT DATA
FORWARDING SECTION 108 OF
PHYSICAL UNIT 101 HOLDS

| KIND OF STATE | STATE |
|---|---|
| SYSTEM STATE OF SELF-UNIT | ACTIVE |
| UNIT-TO-UNIT LINK STATE | FAULT |

Fig. 11A

TABLE THAT UNIT-TO-UNIT DATA
FORWARDING SECTION 108 OF
PHYSICAL UNIT 102 HOLDS

| KIND OF STATE | STATE |
|---|---|
| SYSTEM STATE OF SELF-UNIT | STANDBY |
| UNIT-TO-UNIT LINK STATE | FAULT |

Fig. 11B

| VALUE (BINARY) | APPARATUS TYPE |
|---|---|
| 00 | ACTIVE PHYSICAL UNIT |
| 01 | STANDBY PHYSICAL UNIT |
| 10 | SUBORDINATE APPARATUS |
| 11 | UNUSED |

Fig. 13

| PHYSICAL PORT NUMBER | LA GROUP NUMBER | SYSTEM STATE OF CONNECTION TARGET APPARATUS |
|---|---|---|
| PORT 218 | 10 | ACTIVE |
| PORT 219 | 10 | STANDBY |

Fig. 14

| VALUE (BINARY) | APPARATUS TYPE |
|---|---|
| 00 | VIRTUAL MACHINE ADDRESS INFORMATION |
| 01 | VIRTUALIZATION CONTROL PACKET |
| 10 | UNIT PASSING DATA PACKET |
| 11 | UNUSED |

Fig. 23

| ADDRESS NUMBER | VIRTUAL MACHINE ADDRESS (IPv4) |
|---|---|
| 1 | 192.168.0.1 |
| 2 | 192.168.1.1 |
| 3 | 192.168.2.1 |
| ⋮ | ⋮ |
| 255 | 192.168.254.1 |

| ADDRESS NUMBER | VIRTUAL MACHINE ADDRESS (MAC) |
|---|---|
| 1 | A0:B0:C0:D0:E0.00 |
| 2 | A0:B0:C0:D0:E0.01 |
| 3 | A0:B0:C0:D0:E0.02 |
| ⋮ | ⋮ |
| 255 | A0:B0:C0:D0:E0.FE |

| VALUE (BINARY) | APPARATUS TYPE |
| --- | --- |
| 000 | ADDRESS INFORMATION |
| 001 | VIRTUALIZATION CONTROL PACKET |
| 010 | OTHER DESTINED DATA PACKET (LAYER 2) |
| 011 | OTHER DESTINED DATA PACKET (LAYER 3) |
| 100 | SELF DESTINED DATA PACKET |
| 101 | UNUSED |
| 110 | UNUSED |
| 111 | UNUSED |

Fig. 31

| PHYSICAL PORT NUMBER | BELONGING PHYSICAL UNIT | LA GROUP NUMBER | SUBORDINATE APPARATUS TYPE |
|---|---|---|---|
| PORT 1 | PHYSICAL UNIT 101 | 10 | WITH THIS FUNCTION |
| PORT 2 | PHYSICAL UNIT 102 | 10 | WITH THIS FUNCTION |
| PORT 3 | PHYSICAL UNIT 101 | 20 | WITHOUT THIS FUNCTION |
| PORT 4 | PHYSICAL UNIT 102 | 20 | WITHOUT THIS FUNCTION |

Fig. 35

NETWORK SYSTEM AND NETWORK APPARATUS

CLAIM OF PRIORITY

The present application claims priority from Japanese patent application JP 2010-121874 filed on May 27, 2010, the contents of which are hereby incorporated by reference into this application.

BACKGROUND OF THE INVENTION

1. Field of the Invention

The present invention relates to a network system and a network apparatus, and particularly to a technology for improving the redundancy and the forwarding capability by enabling plural network apparatuses to operate virtually as one network apparatus. More particularly, the invention relates to a technology for maintaining the redundancy and preventing the lower forwarding capability even when a fault occurs on a private line connecting plural network apparatuses through which the control signal is exchanged.

2. Description of the Related Art

In recent years, the number of links to accommodate and the forwarding capability required for the network apparatus such as a router switch have been improved. Therefore, there is a demand that the number of links to accommodate and the forwarding capability can be easily extended without greatly changing the existent network configuration as the scale of an office network increases, for example. In this background, a network system to extend the number of links to accommodate and the forwarding capability by enabling plural network apparatuses to operate as one virtual network apparatus has been proposed.

For example, in a network system called a Virtual Switching System (VSS) as described in non-patent document 1, two chassis-type layer 3 switches (hereinafter referred to as a physical switch) can be operated as one virtual switch (hereinafter a virtual switch).

In the VSS, a control plane (for performing the apparatus control and the protocol process) of two physical switches is divided into active and standby, and a data plane (for performing the packet forwarding) for either is used in the active state, as shown in FIG. 2 of non-patent document 1. Also, in the VSS, it is recommended as a method for connecting to an adjacent server or network apparatus that an adjacent apparatus and each physical switch of the VSS are connected via an individual physical line, and the line is laid by a link aggregation (LA), the LA spanning the physical switch of the VSS. By adopting this connection method, traffic is distributed over two physical switches in transmitting the packets owing to a load balance function of the LA, whereby the forwarding capability for two switches can be effectively utilized. Further, using a unit spanning LA in which each physical switch and the adjacent apparatus are connected via the physical line, and the physical lines are configured as the LA, the VSS and the adjacent apparatus are connected virtually via one line, resulting in a loop-less and redundancy configuration, whereby it is unlikely that the network flutters at the time of fault, as seen in the other L2 redundancy protocols.

It was described that in the VSS, to realize the virtual switch, two physical switches are connected via a private line called a Virtual Switch Link (VSL), as shown in FIG. 4 of non-patent document 1, to exchange the VSS control traffic and the ordinary data traffic (refer to page 7 of non-patent document 1, "Virtual Switch Link"). Also, it was described that the VSS control traffic includes a packet of the VSL control protocol called a Virtual Switch Link Protocol (VSLP) and a control signal exchanged within the apparatus (refer to page 51 of non-patent document 1, "Control Traffic over VSL"). In the following explanation, the VSS control traffic and the ordinary data traffic via the VSL are generically called the VSL traffic.

When the VSL fails but two physical switches do not fail, each physical switch cannot exchange the VSL traffic as described above. Thereby, each physical switch falsely detects that the other physical switch fails, and the standby physical switch switches the self-unit to active, resulting in a state where two active physical switches exist on the network. Thereby, two network apparatuses having the same address exist, and various problems such as a packet loss and false forwarding may possibly occur. To avoid those problems, the VSS has a function of detecting that each physical switch does not fail and only the VSL fails. If a VSL fault is detected using this function, the physical switch in the active control plane shuts down all the ports of the self-unit, and the physical switch in the standby control plane transits to active, thereby avoiding a state where two active apparatuses exist. In the VSS, the state where all the ports are shut down due to occurrence of the VSL fault is called a recovery mode (refer to page 42 of non-patent document 1, "Detection Mechanisms and Configuration").

PRIOR TECHNICAL DOCUMENTS

Non-Patent Documents

Non-patent document 1: Cisco Systems, "Cisco Catalyst 6500 Series Virtual Switching System (VSS) 1440", [Online], Internet<URL:http://www.cisco.com/en/US/prod/collateral/switches/ps5718/ps9336/white_paper_c11_429338.pdf>

SUMMARY OF THE INVENTION

In non-patent document 1, when a fault occurs in only the VSL, no alternate route of the VSL traffic exists. Therefore, the VSS traffic cannot be exchanged between two physical switches, so that the two physical switches cannot be operated virtually as one switch. To avoid this situation, a method in which when a VSL fault occurs, one physical switch is put in a recovery mode to dispense with the virtualization control and the necessity of exchanging the VSL traffic to maintain the communication was described in non-patent document 1.

In the VSS as described in non-patent document 1, the following two problems exist because of the operation in the recovery mode at the time of VSL fault as described above.

Problem (1): Forwarding Capability of the VSS is Reduced by Half.

In non-patent document 1, among two physical switches making up the VSS, the physical switch becoming in the recovery mode cannot be used for the data transfer. Therefore, there is a problem that the forwarding capability usable over the system is decreased 50% at maximum after the VSL fault occurs as compared with before it occurs.

An example in which the forwarding capability decreases is shown in FIGS. 2 and 3. A VSS 300 is composed of the physical switches 301 and 302, and the physical switches 301 and 302 are connected via a VSL 313. Also, a network apparatus 303 is connected to the physical switch 301 via a line 317 and connected to the physical switch 302 via a line 318, in which the lines 317 and 318 provide a unit spanning LA. A network apparatus 304 is connected to the physical switch 301 via a line 319 and connected to the physical switch 302 via a line 320, in which the lines 319 and 320 provide a unit spanning LA. A terminal 305 is connected to the network apparatus 303, a terminal 306 is connected to the physical switch 301, and a network 308 is connected to the network apparatus 304. In FIG. 2, a case is considered in which the traffic via the line 318, the physical switch 302 and the line 320 flows as indicated in the traffic 314 and the traffic via the line 317, the physical switch 301 and the line 319 flows as indicated in the traffic 315-1. If a VSL fault occurs, the physical switch 302 becomes active, and the physical switch 301 transits to the recovery mode to close the ports 309, 311 and 312, disabling the lines 317, 319 and 321, as shown in FIG. 3. Therefore, a fault switching process of the unit spanning LA is performed to switch the route so that the traffic via the lines 317 and 319 may be passed via the lines 318 and 320 that are continuously operative. For example, the route is switched so that the traffic 315-1 before the VSL fault occurs may be passed via the line 318, the physical switch 302 and the line 320, as indicated in the traffic 315-2, after the VSL fault occurs. However, before the VSL fault occurs, the forwarding capability corresponds to two physical switches 301 and 302, and two physical lines can be used between the VSS 300 and the network apparatus 303 and between the VSS 300 and the network apparatus 304, but after the fault occurs, the forwarding capability corresponds to one physical switch, and one physical line can be used. Hence, the forwarding capability of the overall VSS decreases after the VSL fault occurs. If the traffic is evenly distributed by allocation of the unit spanning LA, the forwarding capability decreases 50% at maximum.

Problem (2): the Communication Via the Physical Switch Becoming in the Recovery Mode Cannot be Made.

In non-patent document 1, it is recommended that the unit spanning LA is used as a method for connecting each physical switch making up the VSS and the adjacent apparatus. If the apparatus not supporting the LA is connected to the VSS, there is a form that it is connected to only one physical switch. In this case, there is a problem that when the connected physical switch becomes in the recovery mode due to the VSL fault, the communication with the other apparatus is disconnected.

An example in which a communication interruption between the terminals occurs is shown in FIGS. 2 and 3. In FIG. 2, the terminals 305 and 306 can communicate via the network apparatus 303, the line 317, the physical switch 301 and the line 321, as indicated in the traffic 316-1. However, in FIG. 3, due to the fault switching operation of the LA, the route is switched to pass via the network apparatus 303, the line 318, and the physical switch 302, as indicated in the traffic 316-2. The physical switch 301 closes the ports 309, 311 and 312 because of transition to the recovery mode, so that there is no route connecting the terminals 305 and 306, whereby the packet is discarded. In non-patent document 1, it was described that the specific port can be set to out of blockage in the recovery mode. However, it is recommended that the out of blockage port is set to only the management interface of the physical unit.

As an example, it is supposed that to maintain the communication between the terminals 305 and 306, the ports 309 and 311 on the route of the traffic 316-1 are set to out of blockage, trying to maintain the communication on the traffic 316-1. In this case, if a protocol packet such as BGP is transmitted from the network apparatus 303 to the VSS 300, the packet may be transmitted to the physical switch 301 by LA allocation, because the port 309 is out of blockage in the line 317. In this case, there is no method for transmitting this packet to the physical switch 302 that is newly active, because of the VSL fault. Hence, even if the communication between the terminals 305 and 306 can be maintained, using a function of setting the specific port to out of blockage, there is another problem that the protocol packet destined to the VSS 300 cannot be treated.

In the light of the above-mentioned problems, it is an object of the invention to provide a network system and a network apparatus in which even when a fault occurs on a private line connecting plural network apparatuses to communicate a control signal, the redundancy is maintained and the lower forwarding capability is prevented.

Application Example 1

A network system having at least two physical units that are a first network apparatus and a second network apparatus for exchanging a virtualization packet with each other to operate as a virtual network apparatus, a virtual machine that is a virtual network apparatus constituted by at least a first physical unit and a second physical unit, a subordinate apparatus that is a network apparatus connected to the virtual machine, a unit-to-unit link that is a private line for connecting at least the first physical unit and the second physical unit to exchange the virtualization packet, and a unit spanning LA that is a virtual line connecting at least the first physical unit and the subordinate apparatus and the second physical unit and the subordinate apparatus via the physical lines, and integrating those physical lines, in which the first physical unit or second physical unit includes a physical unit identifier that is a value for identifying the first or second physical unit, a virtualization control section for learning the physical unit identifier except for the self-unit by transmitting and receiving the virtualization packet between the first physical unit and the second physical unit, an apparatus information table for holding the physical unit identifier of the self-unit, and a unit-to-unit data forwarding section for adding a transmitting destination physical unit identifier to the virtualization packet in the first physical unit in transmitting the virtualization packet from the first physical unit to the second physical unit via the unit spanning LA, and performing a receiving process for the virtualization packet if the physical information identifier within the apparatus information table and the transmitting destination physical unit identifier within the virtualization packet are matched in receiving the virtualization packet in the second physical unit, when a fault occurs in the unit-to-unit link, and the subordinate apparatus includes a virtualization control section for collecting the physical unit identifier that is the information for identifying the physical unit from at least the first physical unit and the second physical unit, an LA information table for storing a correspondence table of the physical unit identifier collected by the virtualization control section and the connection with each physical line on the unit spanning LA, and a forwarding plane for determining to which physical line on the unit spanning LA the physical unit identifier added to the virtualization packet received from the physical unit is connected by searching the LA information table, and outputting the packet to the physical line of search result.

A specific example is given below. For example, the virtual machine is constituted by the physical unit A and the physical unit B. The physical unit identifier "A" is assigned to the physical unit A and the physical unit identifier "B" is assigned to the physical unit B. The physical unit A and the physical unit B are connected via the unit-to-unit link. The subordinate apparatus is connected via the line 1 to the physical unit A and connected via the line 2 to the physical unit B, in which the line 1 and the line 2 make up the unit spanning LA. The subordinate apparatus holds beforehand the identifier "A" of the physical unit connected to the line 1 and the identifier "B" of the physical unit connected to the line 2 in the LA information table. In the above network system, when a fault occurs in the unit-to-unit link, if the physical unit A tries to transmit the virtualization packet to the physical unit B, the physical unit A adds "B" as the information on the transmitting destination physical unit to the virtualization packet, and transmits it to the subordinate apparatus, using the line 1. The subordinate apparatus, upon receiving the virtualization packet from the line 1, searches the LA information table, determines that the physical unit identifier "B" designated as the transmitting destination physical unit is connected to the line 2, and outputs the virtualization packet to the line 2. The physical unit B, upon receiving the virtualization packet from the line 2, determines the virtualization packet destined to the self-unit, because the information of the transmitting destination physical unit added to the virtualization packet is "B", and performs the receiving process for the virtualization packet.

For example, reference is made to FIGS. 18 to 20 as will be described later.

Application Example 2

A network system having at least two physical units that are a first network apparatus and a second network apparatus for exchanging a virtualization packet with each other to operate as a virtual network apparatus, a virtual machine that is a virtual network apparatus including at least a first physical unit and a second physical unit, a subordinate apparatus that is a network apparatus connected to the virtual machine, and a unit spanning LA that is a virtual line connecting at least the first physical unit and the subordinate apparatus and the second physical unit and the subordinate apparatus via the physical lines, and integrating those physical lines, in which the first physical unit or second physical unit includes a physical unit identifier that is a value for identifying the first or second physical unit, a virtualization control section for learning the physical unit identifier except for the self-unit by transmitting and receiving the virtualization packet between the first physical unit and the second physical unit, an apparatus information table for holding the physical unit identifier of the self-unit, and a unit-to-unit data forwarding section for adding a transmitting destination physical unit identifier to the virtualization packet in the first physical unit in transmitting the virtualization packet from the first physical unit to the second physical unit via the unit spanning LA, and performing a receiving process for the virtualization packet if the physical information identifier within the apparatus information table and the transmitting destination physical unit identifier within the virtualization packet are matched in receiving the virtualization packet in the second physical unit, and the subordinate apparatus includes a virtualization control section for collecting the physical unit identifier that is the information for identifying the physical unit from at least the first physical unit and the second physical unit, an LA information table for storing a correspondence table of the physical unit identifier collected by the virtualization control section and the connection with each physical line on the unit spanning LA, and a forwarding plane for determining to which physical line on the unit spanning LA the physical unit identifier added to the virtualization packet received from the physical unit is connected by searching the LA information table, and outputting the packet to the physical line of search result.

Specifically, the unit-to-unit link is not provided in the specific example of the application example 1, in which the virtualization packet is exchanged between the physical unit A and the physical unit B through the subordinate apparatus connected via the unit spanning LA at any time.

Application Example 3

The network system as defined in application example 1 or 2, wherein the first physical unit or second physical unit includes a virtual machine identifier that is the number assigned inherently to each virtual machine, a unit-to-unit data forwarding section for adding the virtual machine identifier to the virtualization packet in transmitting the virtualization packet, and confirming the virtual machine identifier added to the virtualization packet in receiving the virtualization packet, in which if there is match with the virtual machine identifier of the virtual machine to which the second physical unit belongs, the unit-to-unit data forwarding section performs a receiving process for the virtualization packet, and a forwarding plane for performing the same process as the packet transmitting and receiving process performed by the subordinate apparatus, if the virtual machine identifier of the virtual machine to which the self-unit belongs is unmatched in receiving the virtualization packet.

Specifically, in the specific example of the application example 1, the subordinate apparatus is made up of the physical unit C and the physical unit D, and connected with the virtual machine via the unit-to-unit link, and holds the LA information table, like the subordinate apparatus of the application example 1. The physical unit A and the physical unit C are connected via the line 1, and the physical unit B and the physical unit D are connected via the line 2, in which the line 1 and the line 2 make up the unit spanning LA, whereby the virtual machine identifier "X" is assigned to the virtual machine made up of the physical units A and B, and the virtual machine identifier "Y" is assigned to the virtual machine made up of the physical units C and D. When the physical unit A transmits the virtualization packet to the physical unit B, the physical unit A adds "B" as information of the transmitting destination physical unit and "X" as the transmitting destination virtual machine information to the virtualization packet, and outputs the virtualization packet to the line 1, thereby transmitting the virtualization packet to the physical unit C. The physical unit C receives the virtualization packet, determines that "X" is added to information of the transmitting destination virtual machine, searches the LA information table to relay the virtualization packet to the physical unit B, and outputs the virtualization packet to the line 2 via the unit-to-unit link and the physical unit D. The physical unit B receives the virtualization packet, and performs the receiving process for the virtualization packet, because both information of the transmitting destination virtual machine and information of the physical unit are matched with the identifiers assigned to the self-unit.

For example, reference is made to FIG. 37 as will be described later.

Application Example 4

The network system as defined in application example 1 or 2, wherein of the first physical unit and the second physical unit, the first physical unit for performing a receiving process for the packet destined to the virtual machine has a virtualization control section for transmitting the address information possessed by the virtual machine to the subordinate apparatus, in which the subordinate apparatus includes a virtual machine address information table for storing the address information received from the virtual machine, and a forwarding plane for searching the virtual machine address information table in receiving the packet and relaying the packet to the virtual machine, and searching the LA information table, and outputting the packet to the physical line connected to the first physical unit on the unit spanning LA, if the information matched with the transmitting destination address of the packet is found.

Specifically, in the specific example of the application example 1, when the address E is added to the virtual machine and the physical unit A performs the receiving process for the packet destined to the virtual machine, the subordinate apparatus holds the address E set to the virtual machine on the virtual machine address table. The subordinate apparatus outputs the packet to the line 1 and transmits thereof to the physical unit A, if the transmitting destination address of the packet is E, in relaying the packet to the virtual machine.

For example, reference is made to FIG. 27 in the second example as will be described later.

Application Example 5

The network system as defined in application example 1 or 2, wherein the subordinate apparatus includes an exception address table that is the table for storing the correspondence between the transmitting destination address of the packet and the transmitting destination physical unit identifier of the virtualization packet, if the packet to be subjected to the relay process in the virtual machine is included in the virtualization packet, in receiving the virtualization packet from the first physical unit or second physical unit, and a forwarding plane for searching the LA exception table to check whether or not the transmitting destination address of the packet is included in the LA exception table, if the output target port is the unit spanning LA line connected to the virtual machine in the route search in receiving the packet, and if it is included, searching the LA information table, using the physical unit identifier corresponding to the address, thereby deciding the physical line connected to the physical unit as indicated as the transmitting destination, and transmitting the packet.

Specifically, in the specific example of the application example 1, when the subordinate apparatus receives the virtualization packet from the physical unit A, and relays it to the physical unit B, if the data packet with the address F set as the transmitting destination address is included within the virtualization packet, the subordinate apparatus holds the correspondence between the address F and the physical unit identifier "B" in the LA exception table. After that, if the transmitting destination address information of the packet is F in relaying the packet to the virtual machine in the subordinate apparatus, the subordinate apparatus outputs the packet to the line 2 and transmits it to the physical unit B.

For example, reference is made to FIG. 28 in the third example as will be described later.

Application Example 6

The network system as defined in application example 1 or 2, including a network apparatus connected to the virtual machine, in which the first physical unit or second physical unit includes a virtualization control section for discriminating whether or not the unit spanning LA line of the virtual machine is connected to the subordinate apparatus by communicating the information with the virtualization control section of the subordinate apparatus, an LA information table section for holding the correspondence between the LA group number that is the number for identifying each unit spanning LA and the presence or absence of the connection with the subordinate apparatus determined by the virtualization control section, and a unit-to-unit data forwarding section for determining the LA group number connected to the subordinate apparatus by searching the LA information table, selecting the physical line existing in the first physical unit from among the physical lines of the LA group, and transmitting the virtualization packet to the selected physical line, if the first physical unit is required to transmit the packet received from the network apparatus to the second physical unit.

Specifically, in the specific example of the application example 1, in the case where the network apparatus G is connected via the line 3 to the physical unit A and via the line 4 to the physical unit B, and the line 3 and the line 4 make up the unit spanning LA, if the packet is relayed from the network apparatus G to the physical unit B, and the output target port is located on the physical unit A, the physical unit B transmits the virtualization packet to the subordinate apparatus using the line 2 by adding "A" as information of the transmitting destination physical unit to the virtualization packet. The subordinate apparatus searches the LA information table, and outputs the virtualization packet to the line 1 to be transmitted to the physical unit A. The physical unit A receives the virtualization packet to take the data packet out of it, and performs the relay process for the data packet.

For example, reference is made to FIG. 34 in the fourth example as will be described later.

Application Example 7

A network apparatus, connected to a network system via an LA, including a forwarding plane for transmitting a packet to the second network apparatus using the physical line on the designated LA line, regarding the LA line as individual physical line in accordance with the information, if the information indicating whether or not the LA line is regarded as individual physical line and the information indicating to which physical line on the LA line the packet is outputted are included in the header information of the packet transmitted from the network system.

Specifically, in a configuration in which there are the apparatus A and the network system B that are connected via the LA made up of the line 1 and the line 2, if the packet that the network system B transmits to the apparatus A using the line 1 has the information with the line 2 as the output port added, the apparatus A outputs the packet received from the line 1 to the line 2 and transmits the packet to the network apparatus B.

For example, reference is made to the subordinate apparatus in the first example as will be described later.

Application Example 8

A network apparatus, connected to a network system via an LA, including an exception address table section for storing the network address and information of the transmitting destination line in receiving any network address and information of the transmitting destination line indicating which physical line of the LA is used to transmit the packet with the any network address as the transmitting destination from the network system, and a forwarding plane for searching the exception address table section in receiving the packet, and transmitting the received packet to the physical line designated within the entry, if the entry matched with the transmitting destination network address is found.

Specifically, there are the apparatus A and the network system B that are connected via the LA made up of the line 1 and the line 2, the network system B instructs the apparatus A to output the packet having the address X to the line 2, and the apparatus A holds the designated information in the exception address table. The apparatus A confirms the transmitting destination address of the packet in relaying the packet to the apparatus B, and if the transmitting destination address is the address X, selects the line 2 as the output target port and outputs the packet.

For example, reference is made to the subordinate apparatus in the second and third examples as will be described later.

According to the first solving means of this invention, there is provided a network system comprising:

a virtual machine being virtually one network apparatus constituted by at least a first physical unit and a second physical unit; and a subordinate apparatus being a network apparatus connected to the virtual machine and, connected to the first physical unit and the second physical unit via physical lines, the physical lines constituting an apparatus spanning link aggregation that is a virtual line integrating the physical lines;

wherein each of the first physical unit and the second physical unit includes:

a unit-to-unit data forwarding section adding identification information of a destination physical unit for specifying the physical unit of transmitting destination to a virtualization packet and, transmitting the virtualization packet to the subordinate apparatus via any of the physical lines constituting the apparatus spanning link aggregation; and wherein the subordinate apparatus includes:

a link aggregation information table storing, with being associated, identification information of a physical unit which is the first physical unit or the second physical unit, and identification information of the physical line which is connected to the physical unit and constitutes the apparatus spanning link aggregation; and a forwarding plane searching the link aggregation information table, based on the identification information of the destination physical unit added to the virtualization packet, for the virtualization packet received from either the first or second physical unit, specifying a corresponding physical line in the apparatus spanning link aggregation, and outputting the virtualization packet via specified physical line to either the first or second physical unit which is a transmission destination.

According to the second solving means of this invention, there is provided a network system according to the network system described above wherein the virtual machine has a unit-to-unit link for exchanging the virtualization packet between the first physical unit and the second physical unit, the virtualization packet including a virtualization control packet for virtualization control and a data packet transmitted and received between the first and second physical units; and the unit-to-unit data forwarding section, when a fault occurs in the unit-to-unit link, adds the identification information of the destination physical unit for specifying the physical unit of transmitting destination to the virtualization packet and, transmits the virtualization packet to the subordinate apparatus via any of the physical lines constituting the apparatus spanning link aggregation.

According to the third solving means of this invention, there is provided a network apparatus connected to a network system via a link aggregation and transmitting a packet to the network system via the link aggregation, comprising a forwarding plane that, in a case where information indicating whether or not a link aggregation line is to be regarded as individual physical lines and information indicating a physical line to which the packet is output in the link aggregation line are included in a header information of the packet transmitted from the network system, regards the link aggregation line as the individual physical lines in accordance with the information and transmits the packet using the physical line in a designated link aggregation line.

According to the fourth solving means of this invention, there is provided a network apparatus connected to a network system via a link aggregation and transmitting a packet to the network system via the link aggregation, comprising:

an exception address table section for storing, when receiving an arbitrary network address and information of a transmitting destination line indicating which physical line of the link aggregation is used to transmit the packet with the arbitrary network address as the transmitting destination from the network system, an entry in which the network address and the information of the transmitting destination line are associated; and a forwarding plane searching the exception address table section when receiving the packet and transmitting received packet to the physical line according to the information of the transmitting destination line in the entry, in a case of being found the entry of which the transmitting destination network address is matched.

According to the present invention, it is possible to provide a network system and a network apparatus in which even when a fault occurs on a private line connecting plural network apparatuses to communicate a control signal, the redundancy is maintained and the lower forwarding capability is prevented.

In the above application example 1, when a fault occurs in the unit-to-unit link connecting each physical unit making up the virtual machine, each physical unit transmits the virtualization packet to the unit spanning LA line connected to the subordinate apparatus, and relays the virtualization packet in the subordinate apparatus, whereby after the fault of the unit-to-unit link, it is possible to continue the exchange of the virtualization packet between each physical unit. Thereby, it is unnecessary to take a workaround of shutting down all the ports on one physical unit in the recovery mode as described in non-patent document 1, and it is possible to continue to maintain the control of the virtual machine. Thereby, as for the problem (1), with the invention, each physical unit can continuously operate while maintaining the system state even at the time of fault of the unit-to-unit link, whereby it is possible to minimize a decrease in the forwarding capability of the overall virtual machine, before and after the fault of the unit-to-unit link. Also, as for the problem (2), with the invention, it is unnecessary to take a workaround of shutting down all the ports of the physical unit at the time of fault of the unit-to-unit link, whereby it is possible to continue to maintain the communication with the apparatus not connected to each physical unit via the unit spanning LA.

Also, in the application example 2, the virtualization packet can be exchanged via the unit spanning LA line, whereby the virtual machine can be constituted even if the unit-to-unit link is not provided.

In the application example 1 or 2, when the virtual network apparatus having the equivalent function to the virtual machine is used as the subordinate apparatus, if the virtualization packet is transmitted from the physical unit to the subordinate apparatus, the subordinate apparatus performs the receiving process for the virtualization packet. Thus, using the application example 3, the virtualization packet can be identified for each virtual machine. Hence, it is possible that the virtual machines are connected, and one virtual machine is operated as the subordinate apparatus.

Also, in the application example 4, when the subordinate apparatus relays the packet destined to the virtual machine to the virtual machine, the output target physical line on the unit spanning LA is selected to be unnecessary to pass the packet between the physical units, whereby it is possible to reduce the virtualization packets via the unit spanning LA and lower the consumption of the band in the unit spanning LA.

Also, in the application example 5, there is provided a correspondence table between the transmitting destination network address and the unit spanning LA physical line connected to the physical unit capable of forwarding the packet having the network address without passing it to another physical unit. Thereby, it is possible to lower the consumption of the band in the apparatus spanning L by preventing the packet relayed by the virtual machine from being exchanged between the physical units using the virtualization packet.

Also, in the application example 6, in the environment where the adjacent apparatus connected to the virtual machine via the unit spanning LA is mixed with not only the subordinate apparatus but also the network apparatus having no function of the subordinate apparatus, when a fault occurs in the unit-to-unit link, if the data packet transmitted from the network apparatus to the first physical unit is required to forward to the physical unit other than the first physical unit, it is possible to continuously forward the data packet between the physical units by using the unit spanning LA line between the subordinate apparatus and each physical unit. Thereby, in the network system of the application example 1 or 2, if at least one of plural network apparatuses connected to the virtual machine via the unit spanning LA has the function of the subordinate apparatus, the other network apparatuses having no function of the subordinate apparatus can make use of the forwarding capability corresponding to the physical units making up the virtual machine, whereby the flexible network configuration can be effected.

Also, in the application example 7, the LA can be regarded as another physical line under the specific conditions. Thereby, in the case where the network apparatus and the network system are composed of the unit spanning LA, the control packet communicated on the network system can be exchanged via the network apparatus, using the unit spanning LA.

Also, in the application example 8, when the packet having the specific address as the transmitting destination address is transmitted to the LA, the specific physical line on the LA can be selected as the output target port. Thereby, when the connection between the network apparatus and the network system is provided via the unit spanning LA, the packet can be transmitted to the port in which the receiving process and the relay process are simplified for the network system connected by the LA, whereby the forwarding capability can be improved.

BRIEF DESCRIPTION OF THE DRAWINGS

FIGS. 10A and 10B are explanatory views showing one example of an apparatus information table during normal operation of the unit-to-unit link in each example of the invention.

FIGS. 11A and 11B are explanatory views showing one example of the apparatus information table at the time of fault of the unit-to-unit link in each example of the invention.

FIG. 13 is an explanatory view showing one example of the values stored in a transmitting source apparatus type and a transmitting destination apparatus type in FIG. 12.

FIG. 14 is an explanatory view showing one example of an LA information table of the subordinate apparatus in the first example of the invention.

FIG. 23 is an explanatory view showing one example of the value stored in a data type in FIG. 22.

FIGS. 25A and 25B are explanatory views showing one example of a virtual machine address in the second example of the invention.

FIG. 31 is an explanatory view showing one example of the value stored in the data type in FIG. 29.

FIG. 35 is an explanatory view showing one example of the information stored in an LA information table in the fourth example of the invention.

DETAILED DESCRIPTION OF THE PREFERRED EMBODIMENTS

The embodiments of the present invention will be described below based on the examples in the following order.

A. First example (first exemplary embodiment)
A-1. Configuration of the example
A-2. Operation when the unit-to-unit link is normal
A-3. Operation when the unit-to-unit link fails
A-4. Effects of the example
B. Second example (second exemplary embodiment)
B-1. Configuration of the example
B-2. Operation when the unit-to-unit link is normal
B-3. Operation when the unit-to-unit link fails
B-4. Effects of the example
C. Third example (third exemplary embodiment)
C-1. Configuration of the example
C-2. Operation when the unit-to-unit link is normal
C-3. Operation when the unit-to-unit link fails
C-4. Effects of the example
D. Fourth example (fourth exemplary embodiment)
D-1. Configuration of the example
D-2. Operation when the unit-to-unit link is normal
D-3. Operation when the unit-to-unit link fails
D-4. Effects of the example
E. Modification

A. First Example

A-1. Configuration of the Example

Figure 1:
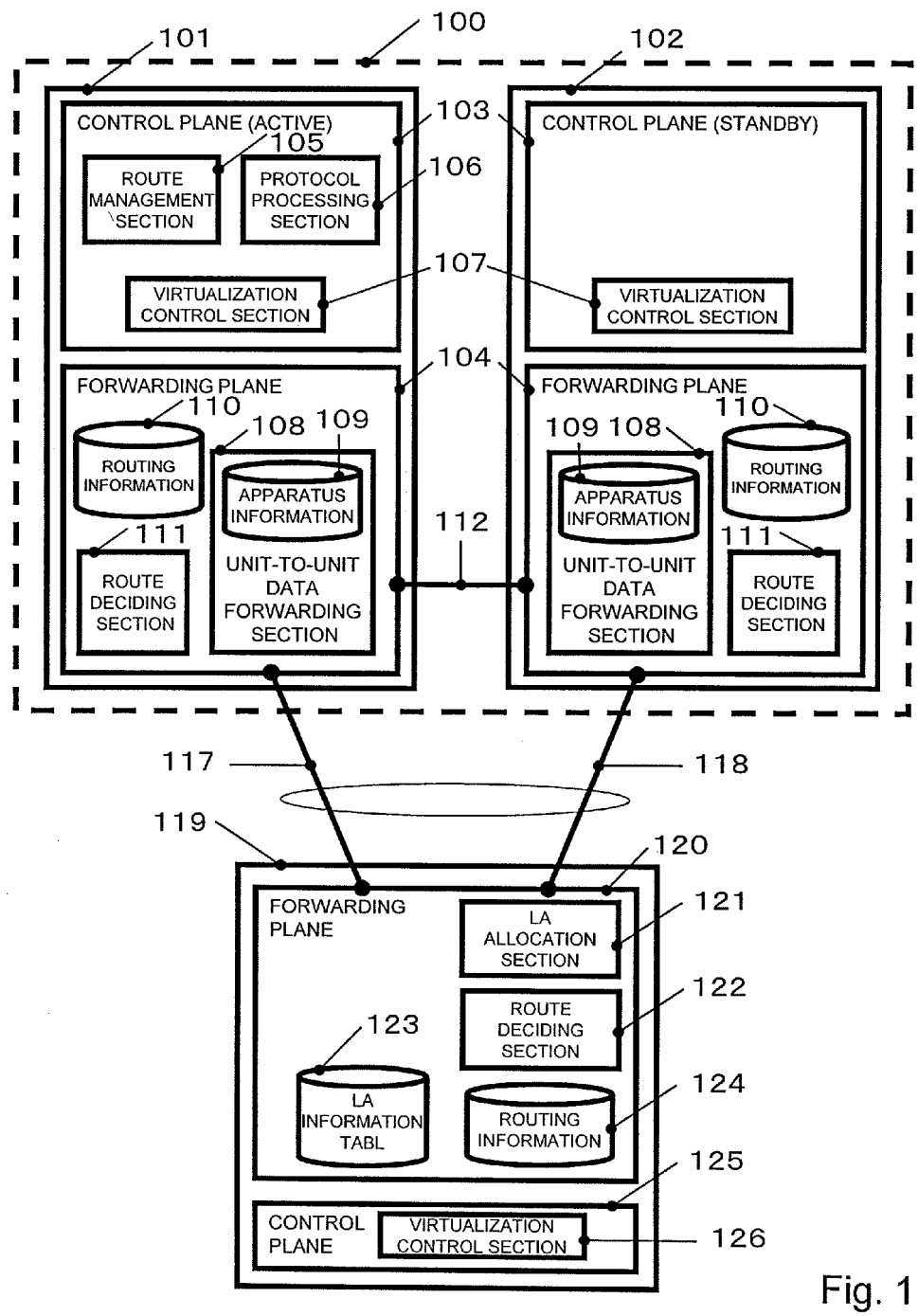
FIG. 1 is an explanatory view showing a schematic configuration in a first example of the present invention.
Figure 2:
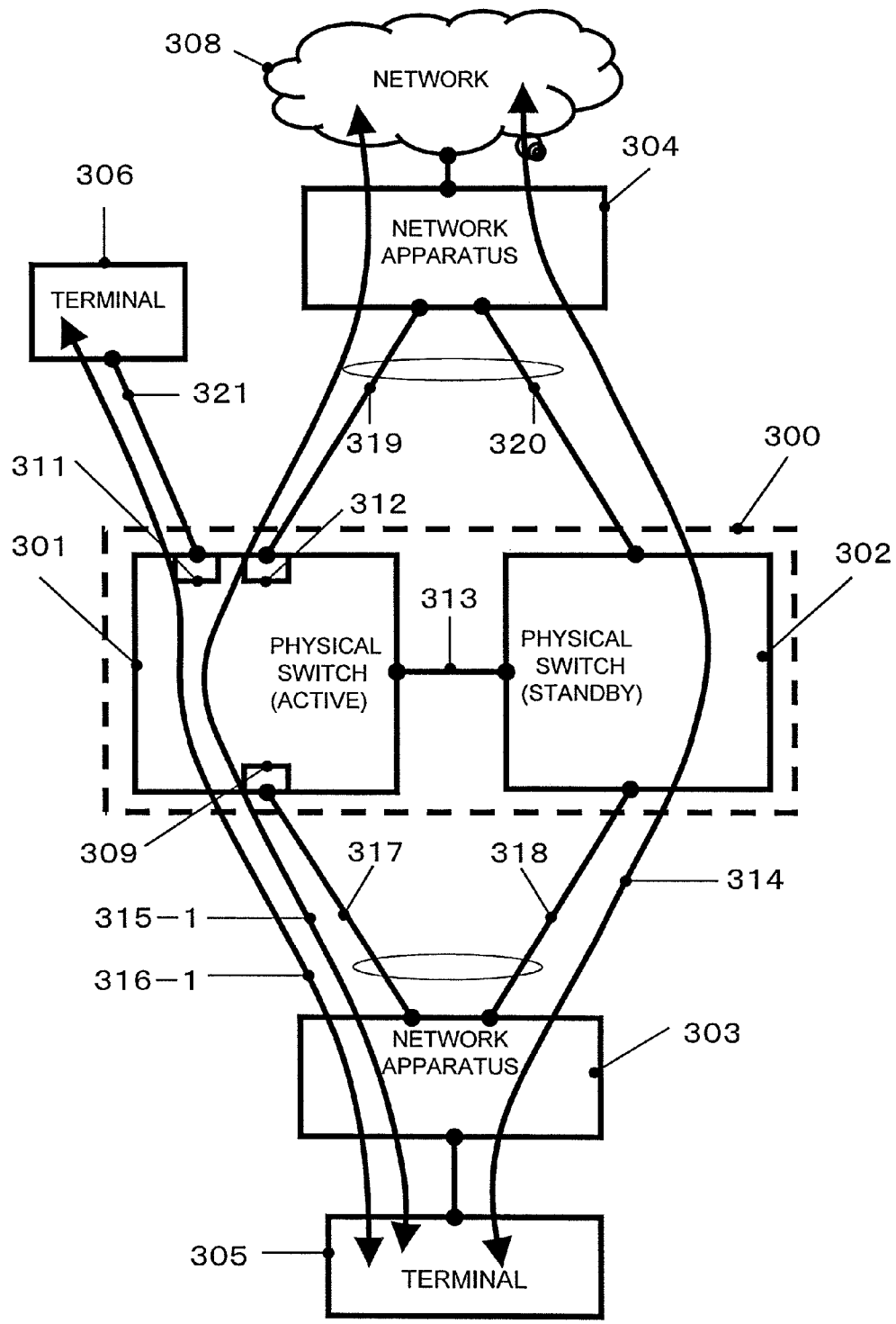
FIG. 2 is an explanatory view showing one example of the VSS operation in non-patent document 1.
Figure 3:
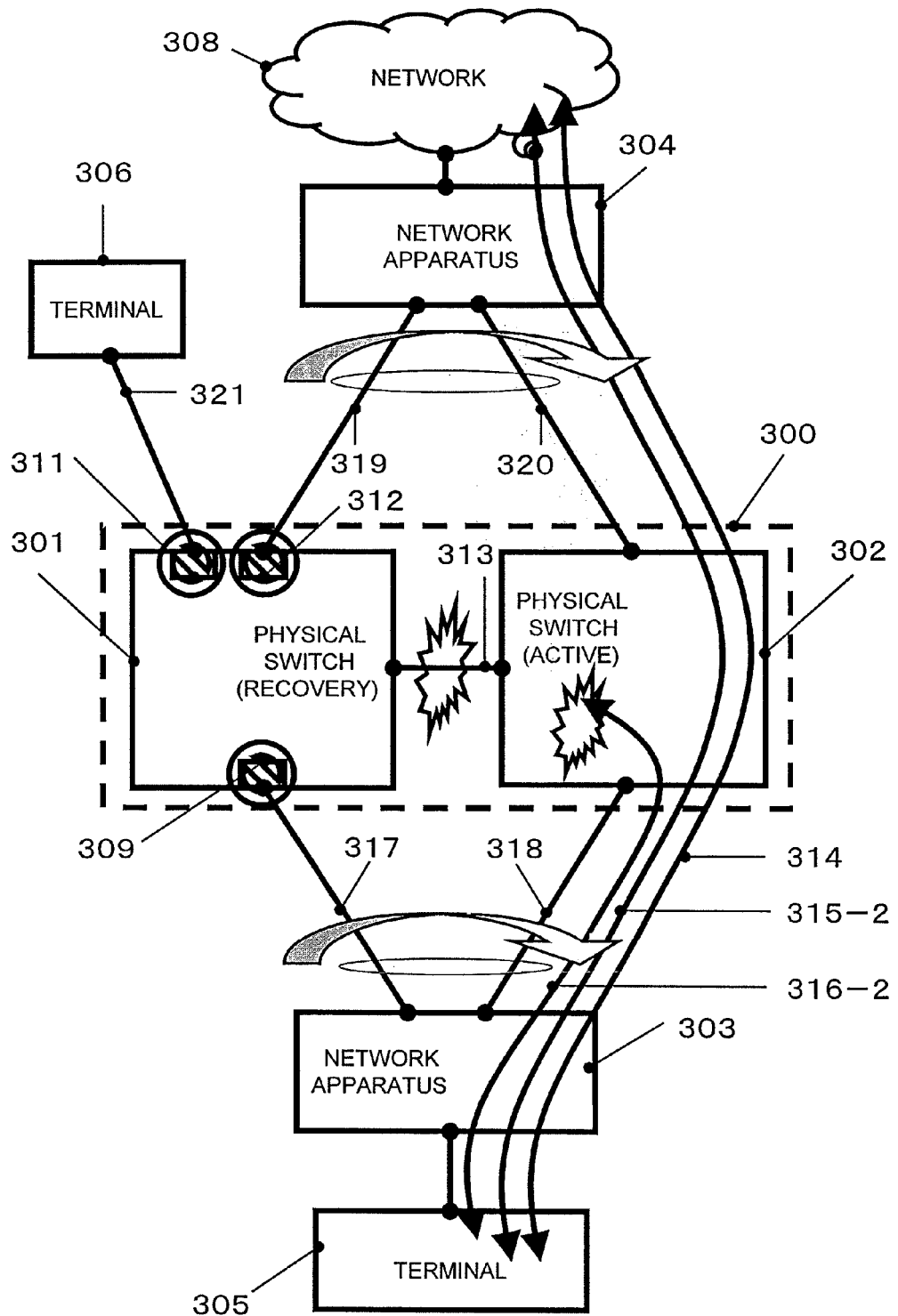
FIG. 3 is an explanatory view showing one example of the VSS operation when a VSL fault occurs in non-patent document 1.

FIG. 1 shows a schematic configuration of a first example. A virtual machine 100 is made up of two physical units 101 and 102, for example, and virtually operates as one network apparatus. A subordinate apparatus 119 is directly connected to the virtual machine 100. An appropriate network apparatus, for example, may be used as the subordinate apparatus. The subordinate apparatus 119 is connected to the virtual machine 100 via a line 117 and a line 118. The line 117 connects between the subordinate apparatus 119 and the physical unit 101, and the line 118 connects between the subordinate apparatus 119 and the physical unit 102, in which two physical lines 117 and 118 are virtually operated as one line owing to an LA. That is, a unit spanning LA that spans two physical units is constructed. In the first example, it is supposed that whether or not each port on the physical unit operates as the port on the unit spanning LA is preset in the apparatus by configuration.

The physical unit 101 making up the virtual machine 100 includes a control plane (control section) 103 and a forwarding plane (forwarding section) 104. Similarly, the physical unit 102 also includes a control plane 103 and a forwarding plane 104.

A virtualization control section 107 operating on the control plane 103 decides which of the physical units 101 and 102 performs the overall control of the virtual machine 100 based on the priority setting by configuration. In the first example, it is decided that the virtualization control section 107 operating in the physical unit 101 takes care of the overall control by configuration. Which of the physical units takes care of the overall control at the time of initialization may be dynamically arranged and decided between the apparatuses.

The control plane 103 on the physical unit 101 for performing the overall control of the virtual machine, there are operating plural units includes a route management section 105 for controlling the route by communicating the packet with the other apparatus in a routing protocol such as a BGP (Boarder Gateway Protocol) or OSPF (Open Shortest Pass First) and a protocol processing section 106 for processing the other network protocols. In this embodiment, among the physical units, each physical unit in which the virtualization control section 107 for controlling the overall virtual machine, the route management section 105, and the protocol processing section 106 operate is represented as an active system. In the first embodiment, the physical unit 101 is the active system.

Also, in the control plane 103 on the physical unit 102, the virtualization control section 107 also operates. The virtualization control section 107 of the physical unit 102 does not perform the overall control of the virtual machine 100, but communicates with the virtualization control section 107 on the physical unit 101 that is the active system, and controls the operation of the physical unit 102 in accordance with the instructions of the virtualization control section 107 on the physical unit 101. Also, in a standby system, the route management section and the protocol processing section may be provided, but do not operate. In this embodiment, among the physical units, the physical unit in which only the virtualization control section operates in the control plane is represented as a standby system. In the first example, the physical unit 102 is the standby system.

To enable the physical units 101 and 102 to operate virtually as one unit, it is required to exchange the control information between the virtualization control sections 107 of the physical units. For example, the control information may be the configuration information, or the routing information learned by the route management section 105. A packet to be exchanged between the physical units for this virtualization control is called a virtualization control packet. To transmit or receive the virtualization control packet between the virtualization control sections 107, the physical units 101 and 102 are connected via a private line. This line is called a unit-to-unit link 112.

The forwarding plane 104 on the physical unit 101, 102 has a unit-to-unit data forwarding section 108, the routing information 110, and a route deciding section 111. Inside the unit-to-unit data forwarding section 108, an apparatus information table 109 storing a system state of the physical unit and a state of the unit-to-unit link is held (e.g., see FIGS. 10A and 10B). The routing information 110 stores the route learned by the route management section 105. The route deciding section 111 retrieves the route on a transmitting destination layer 2 address or a transmitting destination layer 3 address from the routing information 110 in receiving the packet, and performs a packet relay based on the applicable routing information. Also, the unit-to-unit data forwarding section 108 transmits a virtualization control packet to the physical unit 102 via the unit-to-unit link 112 in accordance with an instruction from the virtualization control section 107 or the route deciding section 111 at the normal time (when there is no fault in the unit-to-unit link 112). Also, in a packet relay process of the physical unit, an output port of the packet received by a self-unit may be a port of the other physical unit. In this case, the packet is passed between the physical units, using the unit-to-unit link 112. This is hereinafter called a unit passing data packet (as will be detailed later in A-2). Also, the virtualization control packet and the unit passing data packet are generically called a virtualization packet.

The routing information 110 of the physical unit 101, 102 stores the same routing information through the synchronization process by the virtualization control section 107 of each physical unit. The routing information that the route management section 105 on the physical unit 101 that is the active system delivers to the virtualization control section 107 is not only registered in the routing information 110 of the self-unit, but also transmitted via the unit-to-unit link 112. The virtualization control section 107 of the physical unit 102 that is the standby system receives the routing information from the unit-to-unit link 112, and registers it in the routing information 110 of the self-unit, whereby the routing information of the physical units 101 and 102 are synchronized.

The subordinate apparatus 119 connected to the virtual machine 110 via the unit spanning LA, like the physical units 101 and 102, has a control plane 125 and a forwarding plane 120.

In the control plane 125 of the subordinate apparatus 119, a virtualization control section 126 operates. The virtualization control section 126 acquires a system state of each physical unit from the virtualization control section 107 operating on the physical unit 101, 102 of the virtual machine 100 and stores it in an LA information table 123. The LA information table 123 will be described later in A-3.

The forwarding plane 120 has a route deciding section 122 and the routing information 124. Also, the forwarding plane 120 has an LA allocation section 121 for allocating the relay packet to the lines 117 and 118 of the unit spanning LA, based on a specific algorithm (such as Hash computation), and the LA information table 123 storing the information of each physical line making up the LA.

A-2. Operation when the Unit-to-Unit Link is Normal

Figure 4:
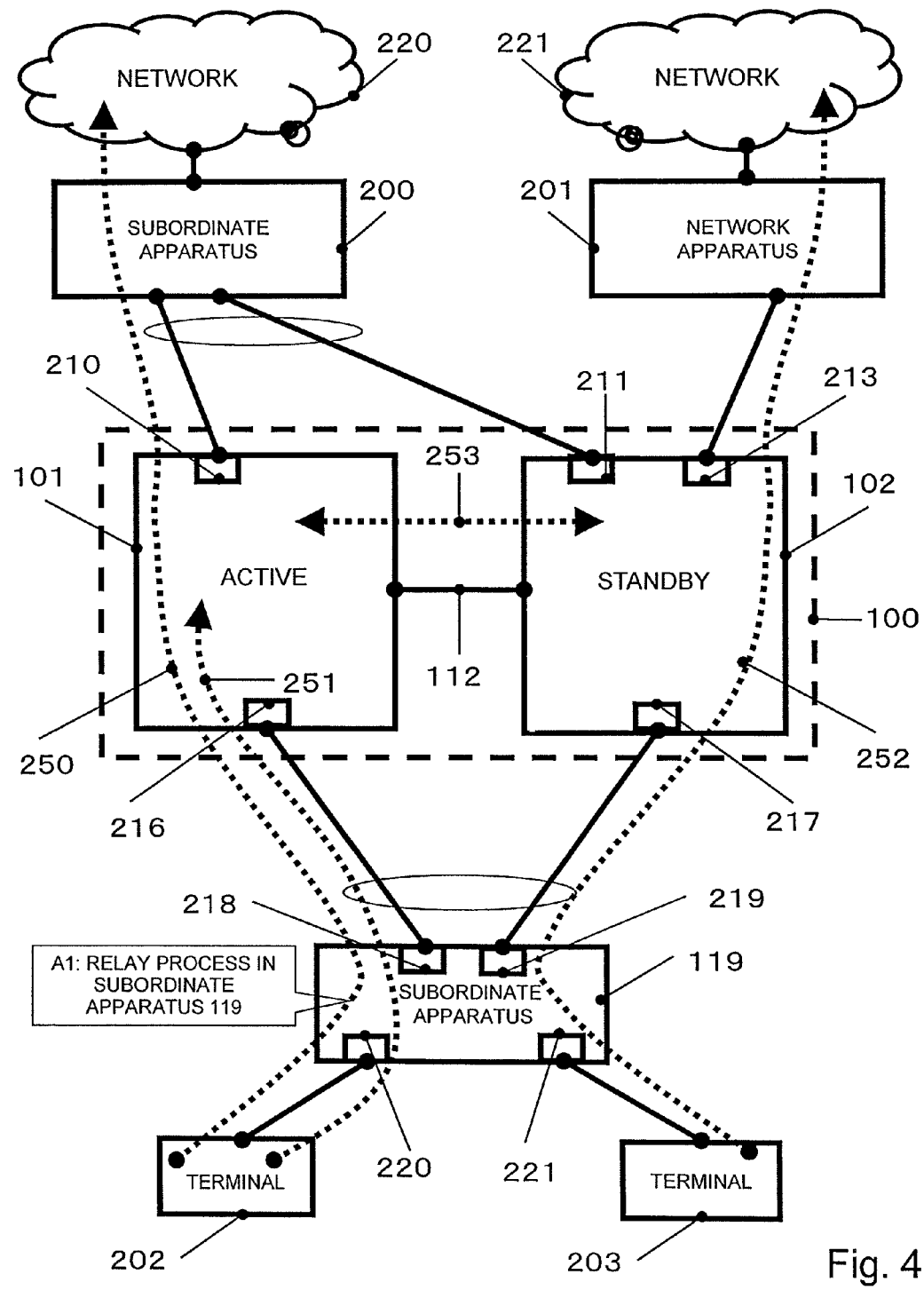
FIG. 4 is an explanatory view showing one example of the packet relay operation during normal operation of a unit-to-unit link in each example of the invention.

FIG. 4 shows an example of a packet forwarding process at the normal time (when there is no fault in the unit-to-unit link 112) in the first example.

In this example, in addition to the virtual machine 100, the physical units 101 and 102, and the subordinate apparatus 119 in FIG. 1, a subordinate apparatus 200 connected via the unit spanning LA to the virtual machine 100, a network apparatus 201 connected via one line to the virtual machine 100, a network 220 connected to the subordinate apparatus 200, a network 221 connected to the network apparatus 201, and the terminals 202 and 203 connected to the subordinate apparatus 119 are arranged. In this example, the subordinate apparatuses 119 and 200 are connected to both the physical units 101 and 102 via the unit spanning LA, and the network apparatus 201 is connected to the physical unit 102 only. In the virtual machine 100, each of the ports 216 and 217, and the ports 210 and 211 is set as the port on the unit spanning LA by configuration. Also, the internal configuration of the subordinate apparatus 200 is the same as that of the subordinate apparatus 119 in FIG. 1. In the first example, it is presupposed that the apparatus connected via the unit spanning LA to the virtual machine is the subordinate apparatus only.

As previously described in A-1, a virtualization control packet, like a packet 253 in FIG. 4, is exchanged between the physical units 101 and 102 in the unit-to-unit link 112.

Figure 5:
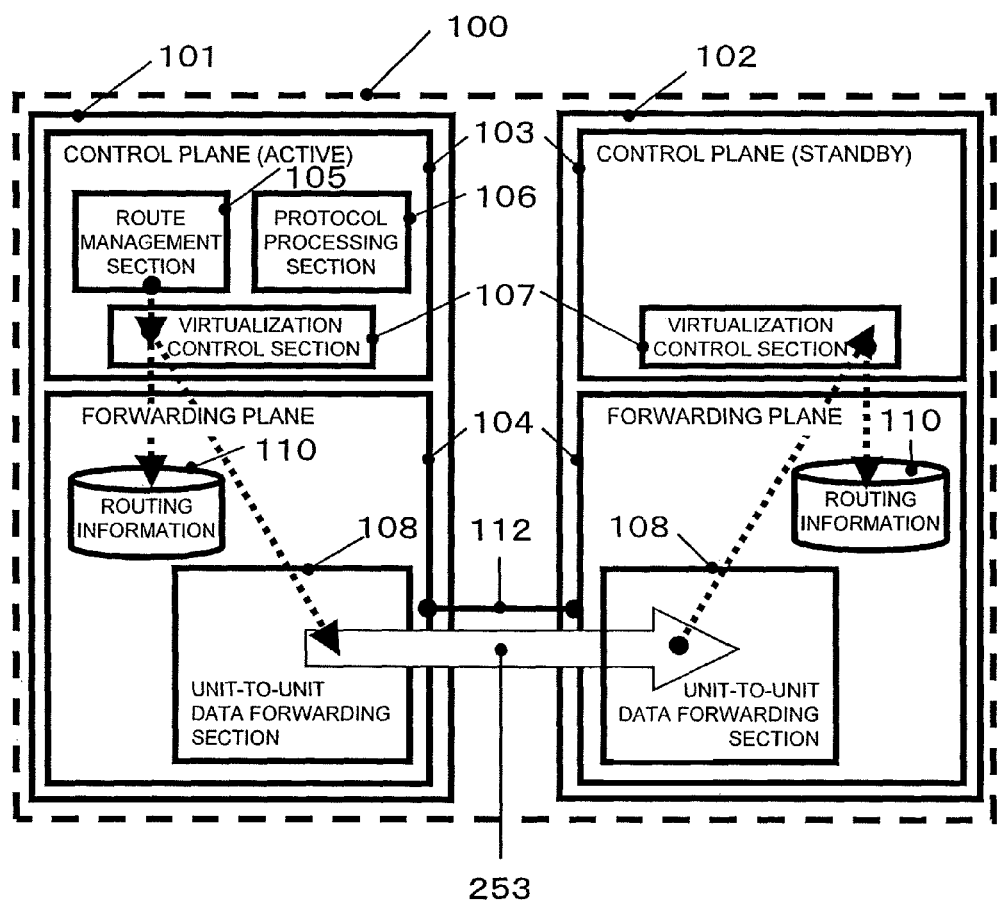
FIG. 5 is an explanatory view showing the operation of transmitting and receiving the virtualization control packet under normal conditions in each example of the invention.

In FIG. 5, an example where the packet 253 is transmitted via the unit-to-unit link 112 is shown. In this example, the virtualization control packet is transmitted to synchronize the route learned in the route management section 105 of the active physical unit 101 with the physical unit 102. The route management section 105 of the physical unit 101 transmits the learned routing information to the virtualization control section 107. The virtualization control section 107 reflects the routing information to the routing information 110 on the physical unit 101, and instructs the unit-to-unit data forwarding section 108 to transmit the routing information to the physical unit 102. Upon receiving this, the unit-to-unit data forwarding section 108 generates the packet 253 that is the virtualization control packet including the routing information, and transmits it to the physical unit 102 via the unit-to-unit link 112. The forwarding plane 104 of the physical unit 102, receiving the packet 253, instructs the unit-to-unit data forwarding section 108 to perform the packet process. The unit-to-unit data forwarding section 108 on the physical unit 102 takes the routing information out of the virtualization control packet, and transmits it to the virtualization control section 107 of the self-unit. The virtualization control section 107 reflects this routing information to the routing information 110 of the self-unit, whereby the routing synchronization between the physical units 101 and 102 is completed.

In the case where a packet is transmitted to the apparatus (not shown) existing on the network 220 from the terminal 202, like a packet 250 as shown in FIG. 4, the packet 250 transmitted from the terminal 202 is transmitted to the subordinate apparatus 119, and the subordinate apparatus 119 receiving this packet performs a relay process a1.

Figure 6:
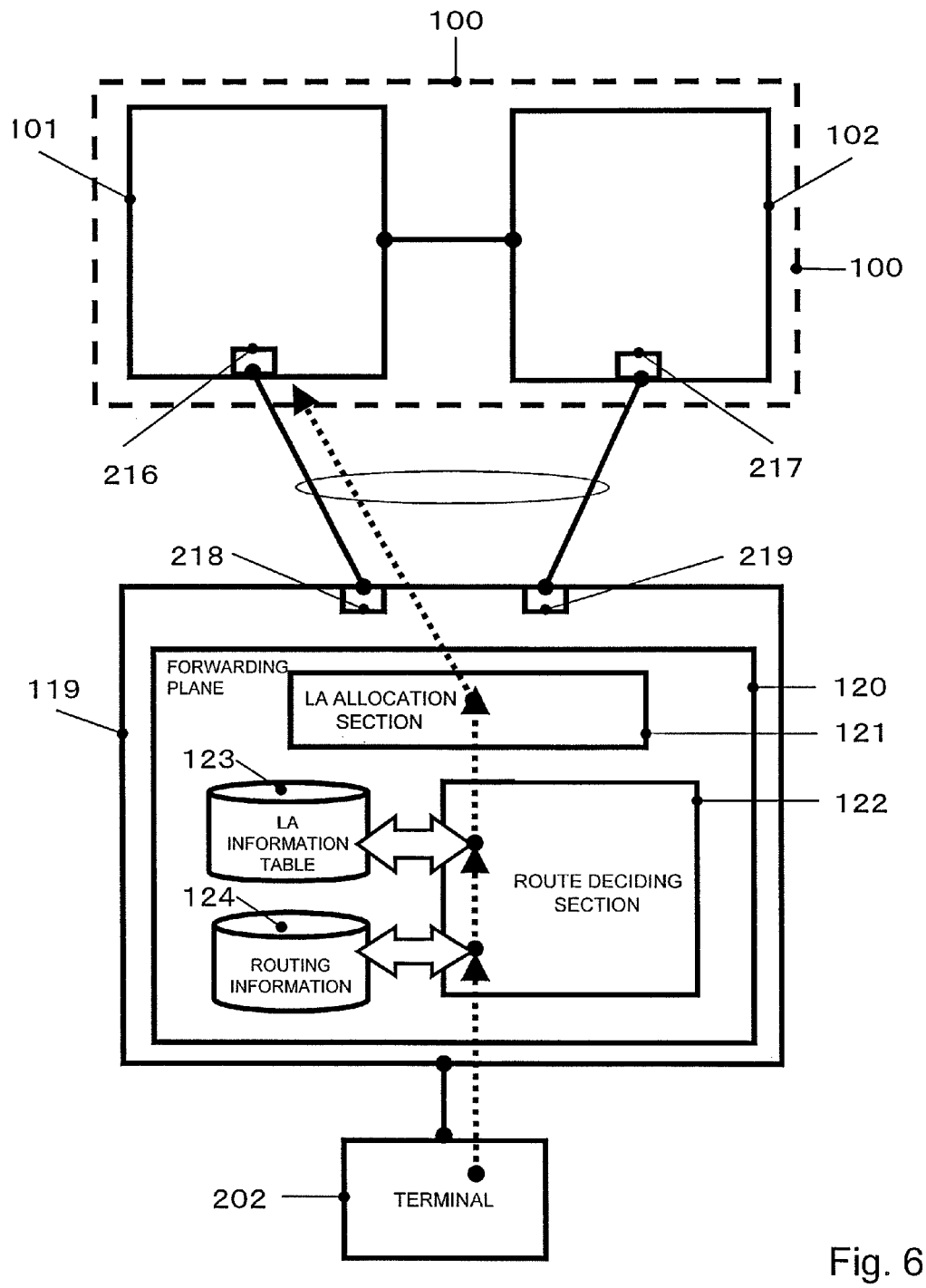
FIG. 6 is an explanatory view showing the packet forwarding operation in a subordinate apparatus in each example of the invention.

FIG. 6 shows the details of a1. The subordinate apparatus 119, receiving the packet from the terminal 202, instructs the route deciding section 122 to decide an output target port of the received packet. The route deciding section 122 searches the routing information 124 and the LA information table 123 in order, and selects an LA port composed of the ports 218 and 219 as the output target port. Then, the packet is passed to the LA allocation section 121 to select the port 218 or 219 to which the packet is allocated using a specific algorithm, based on the header information of the packet. If the port 218 is selected, the packet arrives at the port 216 of the physical unit 101.

The physical unit 101, receiving the packet from the subordinate apparatus 119, performs the route search to decide the output target port. In the relay process of the packet in which the apparatus on the network 220 is the destination, like the packet 250 of FIG. 4, the LA composed of the ports 210 and 211 is selected as the output target port. At this time, if the port 210 is selected, the port 210 is selected as the output target port and the packet is transmitted to the subordinate apparatus 200, because the packet can be relayed not via the unit-to-unit link 112.

In the case where the packet is transmitted to the apparatus (not shown) existing on the network 221 from the terminal 203, like a packet 252 of FIG. 4, the same relay process as the relay process a1 is performed in the subordinate apparatus 119. If the port 219 is selected by LA allocation, the relay process is performed in the physical unit 102. The physical unit 102, receiving the packet from the subordinate apparatus 119, performs the route search. As a result of search, the port 213 is selected as the output target port, and the packet is transmitted to the network apparatus 201.

Also, in the case where the packet (such as a protocol packet), like a packet 251 as shown in FIG. 4, is transmitted from the terminal 202 to the virtual machine 100 and the port 218 is selected through the LA allocation process of the subordinate apparatus 119, the active physical unit 101 receives the data packet and performs the packet process.

Figure 7:
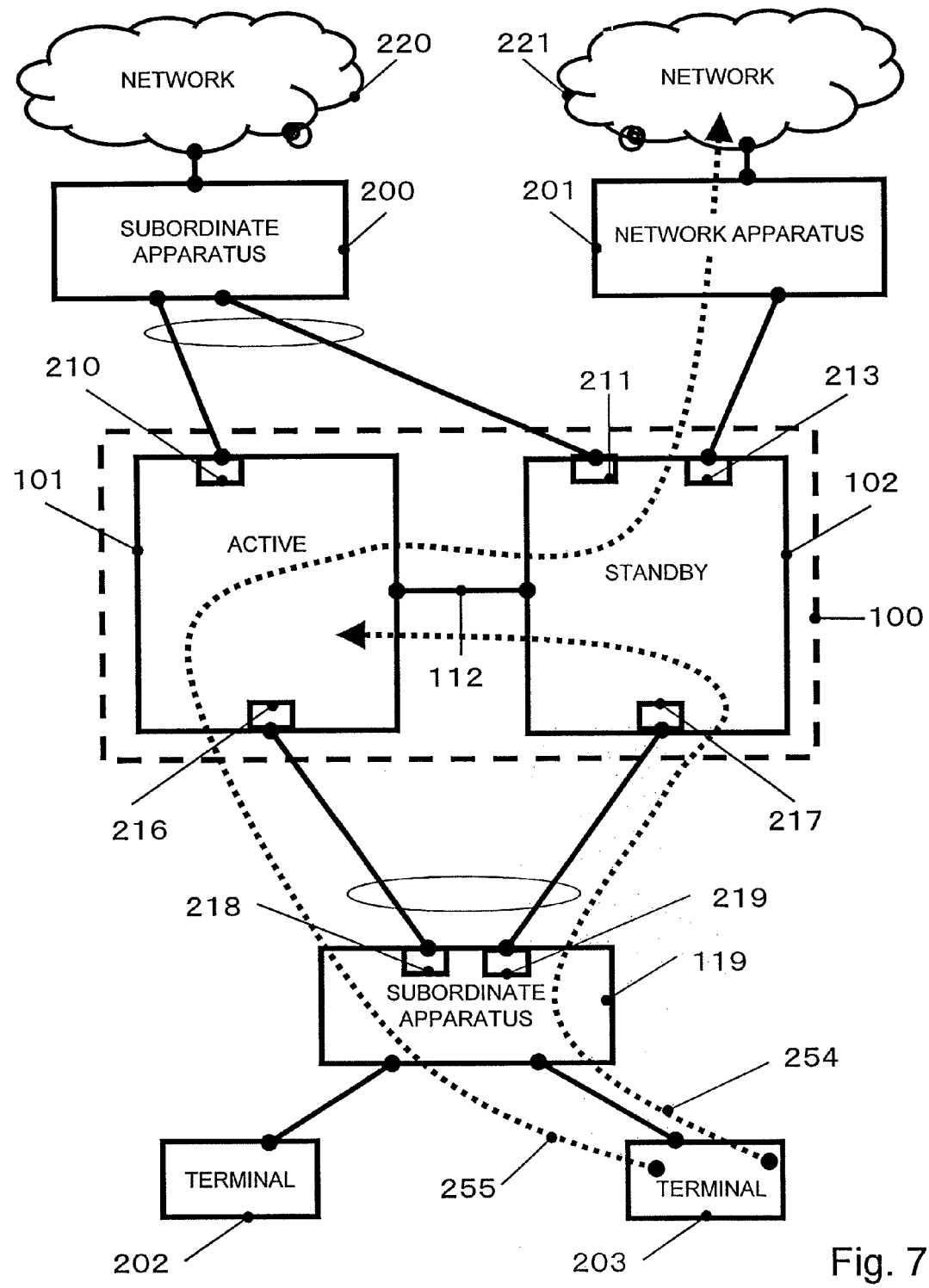
FIG. 7 is an explanatory view showing one example of the operation of a unit passing data packet in each example of the invention.

FIG. 7 shows an example of communicating the unit passing data packet on the unit-to-unit link 112. If the data packet destined to the virtual machine 100, like a packet 254, is received in the standby physical unit 102, it is transmitted to the physical unit 101 via the unit-to-unit link 112. Also, if the data packet destined to the apparatus on the network 221, like a packet 255, is received in the physical unit 101, the packet is relayed via the unit-to-unit link 112 to the physical unit 102 and the network apparatus 201 in order.

Figure 8:
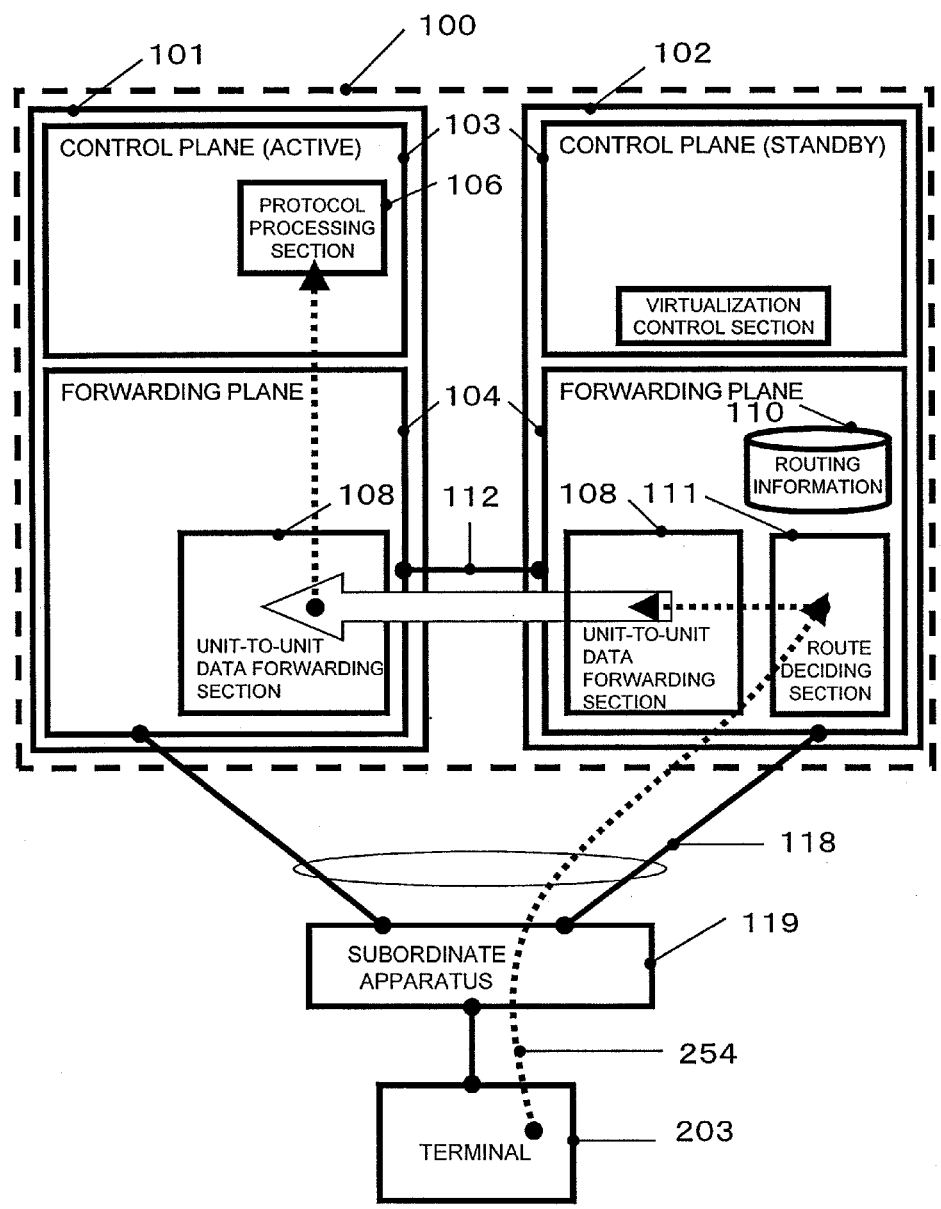
FIG. 8 is an explanatory view showing the operation of forwarding a data packet destined to a virtual machine from a standby physical unit to an active physical unit in each example of the invention.

FIG. 8 shows an example of transmitting the packet 254 destined to the virtual machine 100 from the standby physical unit 102 to the active physical unit 101 via the unit-to-unit link.

The data packet to be processed in the protocol processing section 106 of the physical unit 101 is transmitted from the terminal 203 to the subordinate apparatus 119. The subordinate apparatus 119, receiving this data packet, performs the LA allocation process. Herein, an example in which the packet is relayed via the line 118 to the physical unit 102 will be described below. The physical unit 102, receiving the data packet, searches the routing information 110 in the route deciding section 111, and determines the data packet destined to the virtual machine 100. The route deciding section 111 instructs the unit-to-unit data forwarding section 108 to transmit the received data packet to the active physical unit 101. The unit-to-unit data forwarding section 108 encapsulates the received data packet by adding a header exclusive for the unit-to-unit link to it and generates a unit passing data packet. This exclusive header stores the information of instructing the physical unit 101 to receive the data included in the unit passing data packet in the physical unit 101. The unit passing data packet is passed via the unit-to-unit link 112 to the unit-to-unit data forwarding section 108 of the physical unit 101. The unit-to-unit data forwarding section 108 takes the data packet out of the unit passing data packet, and selects the protocol processing section 106 for receiving the data packet from the header information (such as TCP, UDP header, etc.) included in the data packet to give an instruction for the packet process.

Figure 9:
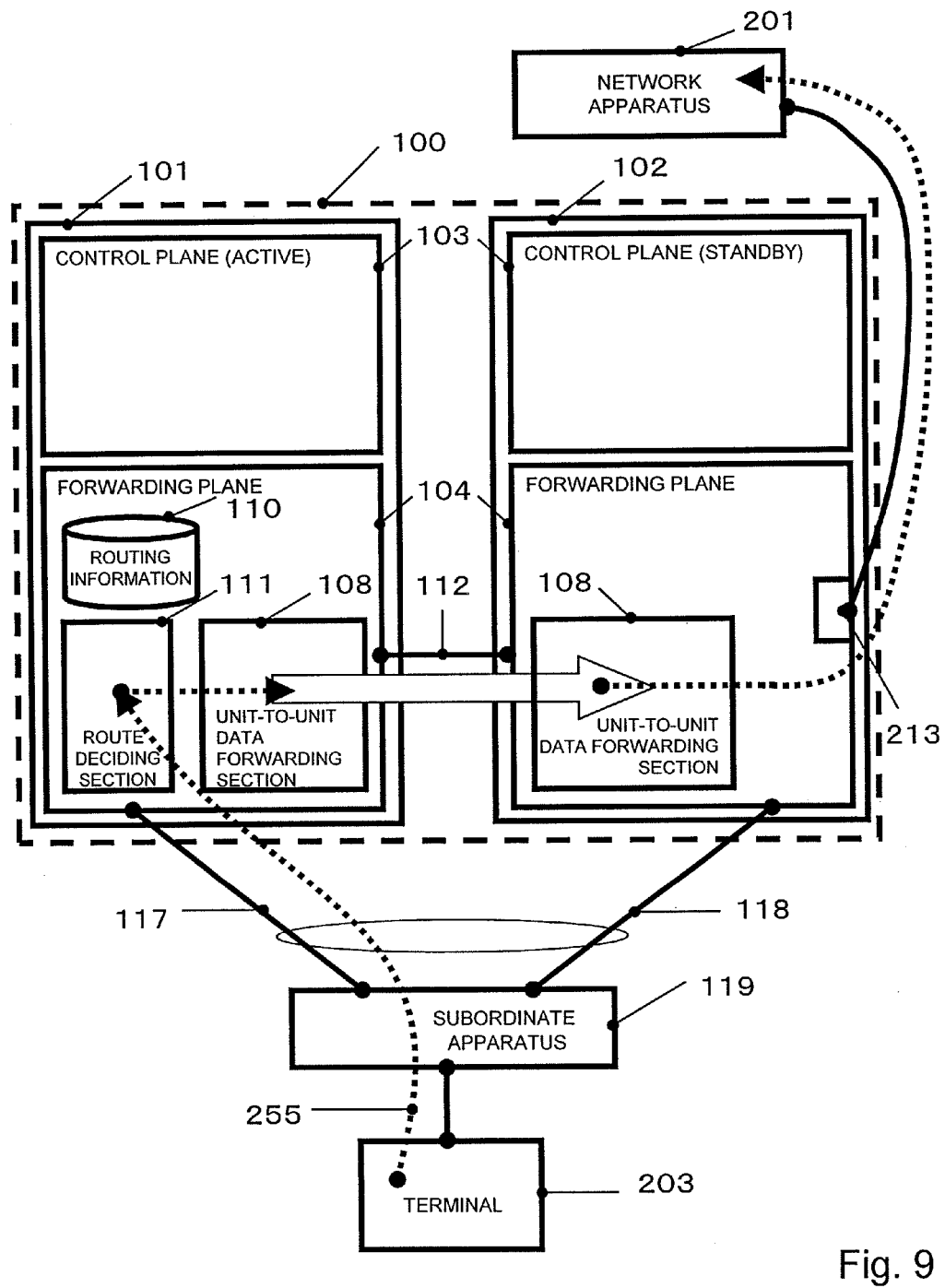
FIG. 9 is an explanatory view showing the operation of forwarding the data packet for performing the relay process in the virtual machine between the physical units in each example of the invention.

FIG. 9 shows an example of relaying a packet 255 via the unit-to-unit link.

If the packet 255 is transmitted from the terminal 203, the subordinate apparatus 119, receiving it, relays it to the physical unit 101, via the line 117 here, through the LA allocation process. The physical unit 101, receiving the data packet, searches the routing information 110 in the route deciding section 111, and selects the port 213 on the physical unit 102 as the output target port. If the output target port is the port of another physical unit, the route deciding section 111 requests the unit-to-unit data forwarding section 108 to transmit the packet via the unit-to-unit link 112. The unit-to-unit data forwarding section 108 encapsulates the data packet received from the route deciding section 111 by adding a header exclusive for the unit-to-unit link to it and generates a unit passing data packet. This exclusive header stores the information of instructing the physical unit 102 to output the packet to the port 213. The unit passing data packet is passed via the unit-to-unit link 112 to the unit-to-unit data forwarding section 108 of the physical unit 102. The unit-to-unit data forwarding section 108 takes the data packet out of the unit passing data packet, and transmits it to the port 213 based on the information of the output target port stored in the header.

The above is the operation when the unit-to-unit link is normal.

A-3. Operation when the Unit-to-Unit Link Fails

Herein, in the configuration as described in A-1 and A-2, a method for solving the previously-mentioned problems (1) and (2) when a fault occurs in the unit-to-unit link 112 will be described below.

In the first example, the unit spanning LA line between the virtual machine and the subordinate apparatus is used as an alternate route in detecting a fault of the unit-to-unit link 112. For example, in the configuration example as shown in FIGS. 4 and 7, the unit spanning LA line between the virtual machine 100 (physical units 101, 102) and the subordinate apparatus (subordinate apparatus 119, subordinate apparatus 200) applies. However, when a normal process for LA line is performed, it is regarded as the loop of the same line. Therefore, in the first example, for the data to be transmitted via the unit-to-unit link, a process using the unit spanning LA line as individual physical line is performed. To perform this process, the unit-to-unit data forwarding section 108 adds an LA relay header of original header and makes the encapsulation. The packet with the LA relay header added is hereinafter called an LA relay packet. The subordinate apparatus 119 or 200, in receiving the LA relay packet from each physical unit 101, 102 of the virtual machine 100, performs the relay process for the packet, not as the unit spanning LA, but as two different physical lines, based on the information included in the LA relay header. For a method for detecting the fault of the unit-to-unit link may be the same as described in non-patent document 1, or any other appropriate method may be employed.

To use the unit spanning LA line as the alternate line when the unit-to-unit link fails, the unit-to-unit data forwarding section 108 of each physical unit 101, 102 performs an encapsulation and de-capsulation process with the LA relay header. In each physical unit 101, 102, a table as shown in FIGS. 10 and 11 is held on the unit-to-unit data forwarding section 108 to carry out this process. This table is called an apparatus information table 109. The apparatus information table 109 holds two kinds of states, including a system state of the self-unit indicating the active or standby system and a unit-to-unit link state, for example. The virtualization control section 107 operating in the control plane 103 of the self-unit manages these states, in which the state is changed at any time upon switching between the active system and the standby system, or the occurrence of fault in the unit-to-unit link.

FIGS. 10A and 10B are examples of table information at the normal time when there is no fault in the virtual machine 100. If a fault occurs in the unit-to-unit link 112, the virtualization control section 107 of each physical unit detects the occurrence of the fault, and instructs the unit-to-unit data forwarding section 108 to change the unit-to-unit link state to "fault", for example, as shown in FIGS. 11A and 11B.

Figure 12:
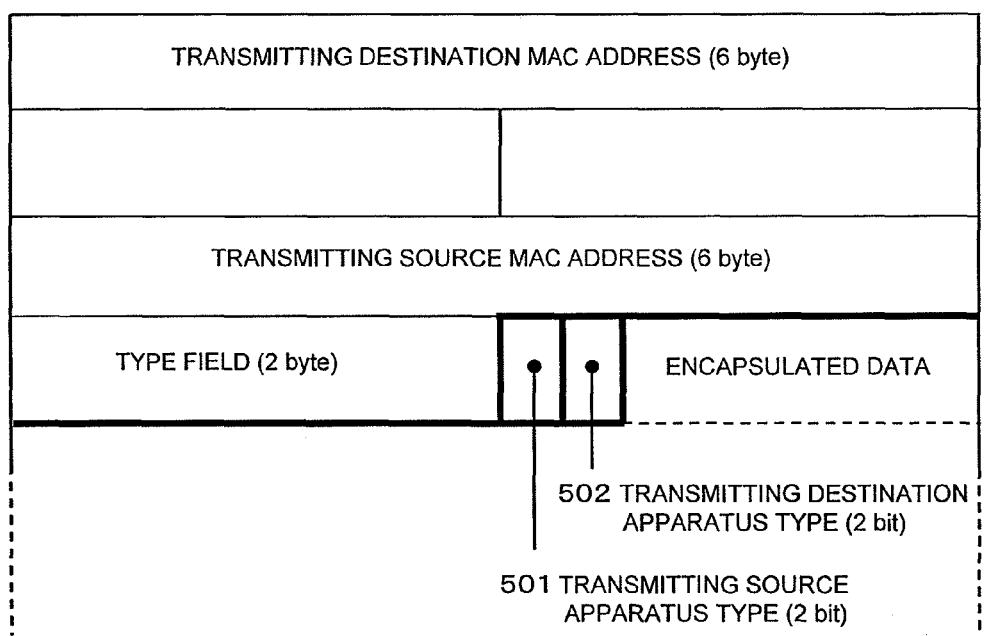
FIG. 12 is an explanatory view showing the frame format of an LA relay packet in the first example of the invention.

FIG. 12 shows the frame format of an LA relay packet that is communicated via the unit spanning LA. In the case where the Ethernet II (registered trademark) standard is used for the layer 2 protocol, a transmitting destination MAC address, a transmitting source MAC address and a Type field are arranged. In the MAC address, any MAC address such as a MAC address inherent to the maker, an apparatus MAC address of each apparatus, or a multi-cast address may be stored, as far as the adjacent apparatus starts the receiving process at the MAC address. Also, in the Type field, a value for identifying the protocol following the Ethernet header is stored. In the first example, an inherent value for identifying the LA relay packet is stored in the Type field. If the layer 2 protocol for use is other than the Ethernet II, the header conforming to the protocol is employed. In the first example, a transmitting source apparatus type 501 and a transmitting destination apparatus type 502 are stored in the LA relay header, directly after the layer 2 header. Each physical unit and the subordinate apparatus can identify the transmitting source and destination of the LA relay packet from the transmitting source apparatus type 501 and the transmitting destination apparatus type 502. In the first example, it is required that the active physical unit 101, the standby physical unit 102, and the subordinate apparatus 119 can be identified, in which it suffices that the bit width is 2 bits. As one example, a bit sequence of values stored in the transmitting source apparatus type 501 and the transmitting destination apparatus type 502 is associated with the apparatus type, as shown in FIG. 13. Following the transmitting destination apparatus type 502, the packet (virtualization control packet, unit passing data packet) normally communicated via the unit-to-unit link is encapsulated and stored. The case where three or more physical units make up the virtual machine will be described later in E. modification.

In the subordinate apparatus 119, the information on to which of the active physical unit and the standby physical unit of the virtual machine 100 each physical line making up the unit spanning LA is connected is needed to relay the LA relay packet. In the first example, a field indicating the system state of the connection target physical unit is added to the LA information table 123 held in the subordinate apparatus 119, 200, to discriminate the physical unit type of connection target.

FIG. 14 shows an example in which the information of the system state of the connection target apparatus is added to the LA information table 123. The LA information table 123 stores, with being associated, the physical port number, the LA group number (LA identifier), and the system information of the connection target apparatus (information of physical unit), for example. The ports 218 and 219 of the subordinate apparatus store the information indicating the connection to the active system and the standby system, respectively. The system state field stored in the LA information table 123 is updated at the time of initialization of the virtual machine 100 or in the event of switching between the active system and the standby system because the virtualization control section 107 of the physical unit 101, 102 and the virtualization control section 126 of the subordinate apparatus 119, 200 exchange the information.

Figure 15:
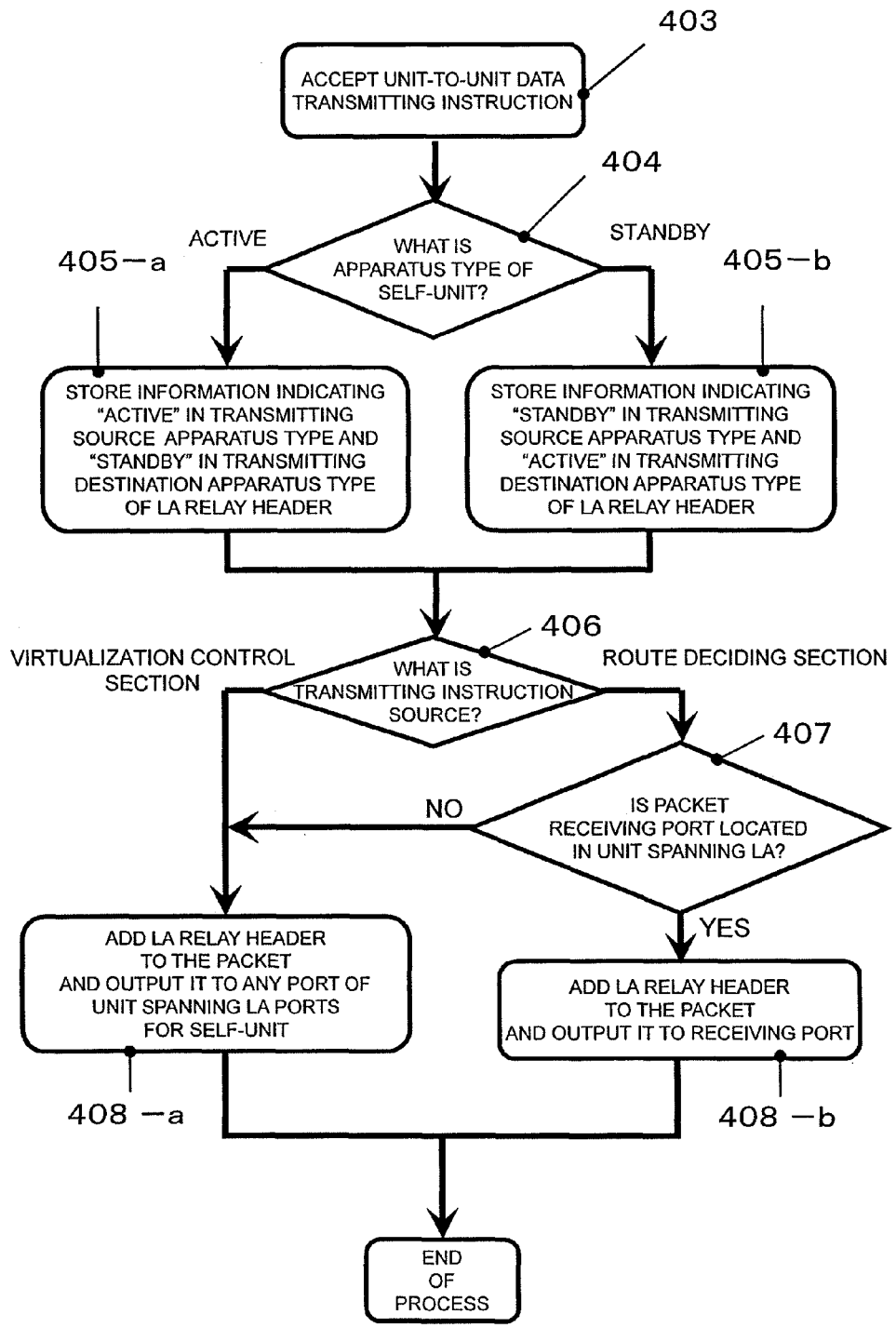
FIG. 15 is a flowchart showing the procedure of an LA relay packet transmitting process in a unit-to-unit data forwarding section when a unit-to-unit link fails in each example of the invention.
Figure 16:
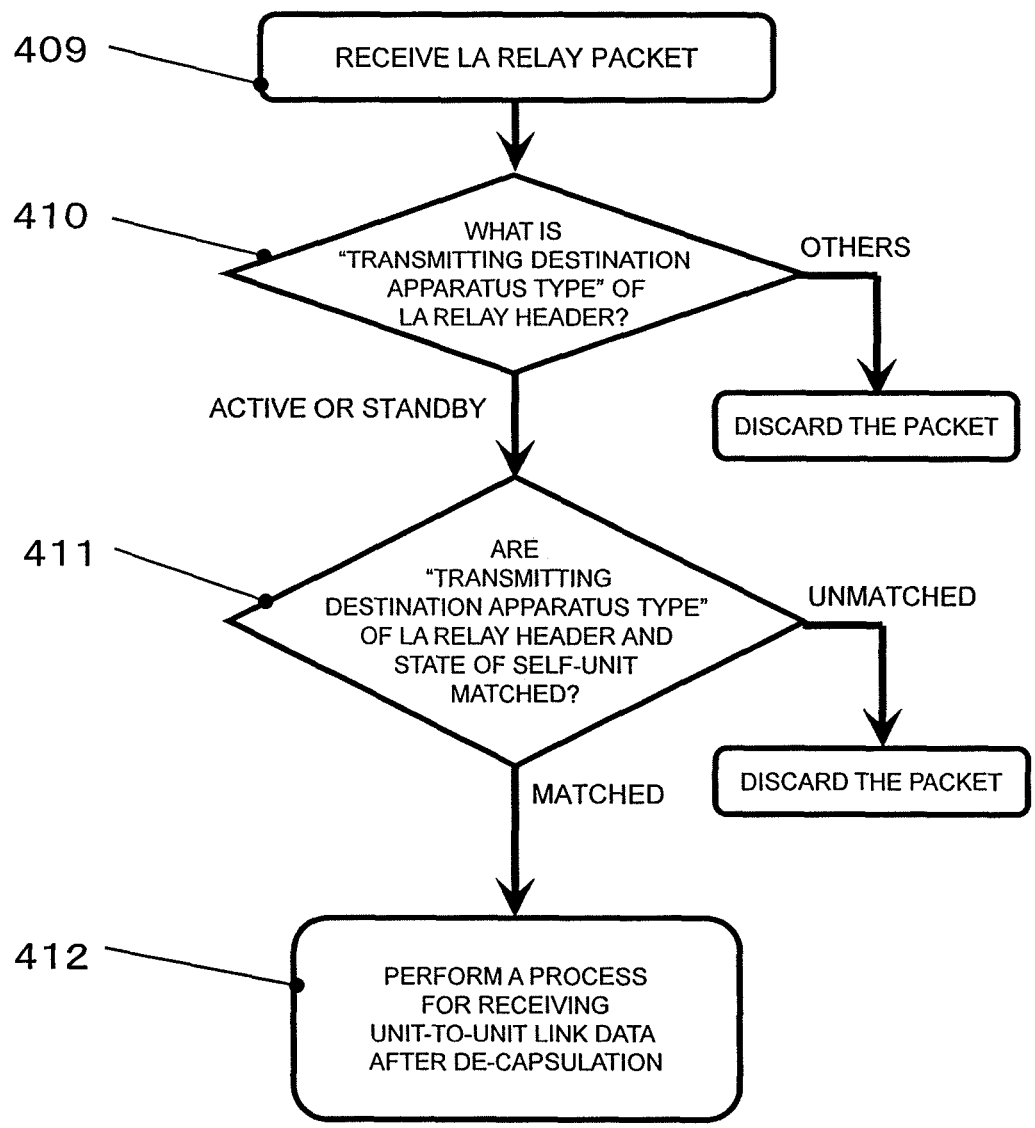
FIG. 16 is a flowchart showing the procedure of an LA relay packet receiving process in the unit-to-unit data forwarding section in each example of the invention.
Figure 17:
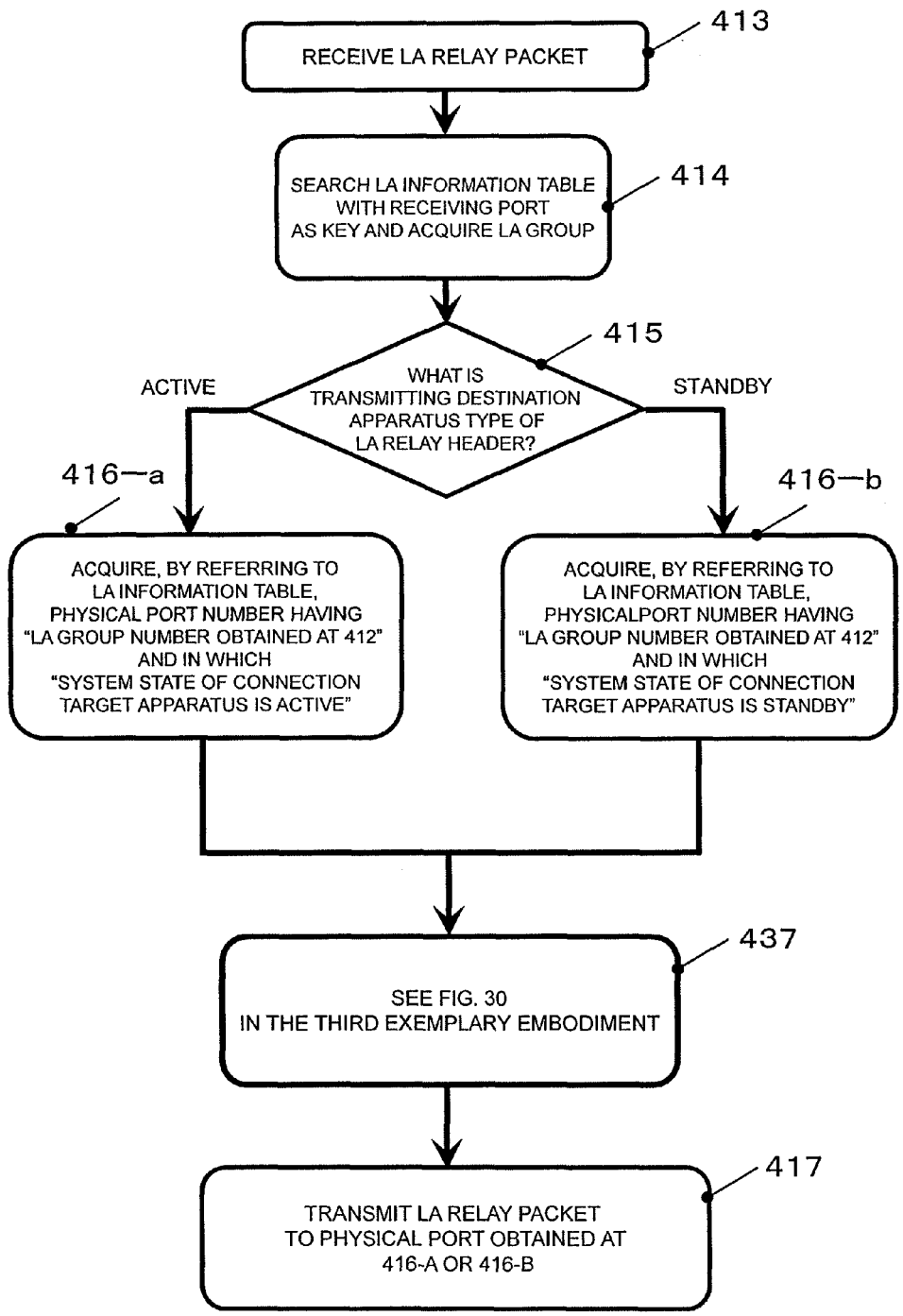
FIG. 17 is a flowchart showing the procedure of an LA relay packet relaying process in a forwarding plane of the subordinate apparatus in each example of the invention.

FIG. 15 is a flowchart showing a process of generating an LA relay packet and transmitting it to the unit spanning LA line if an instruction of transmitting the packet via the unit-to-unit link is given from the virtualization control section 107 or the route deciding section 111 to the unit-to-unit data forwarding section 108 of the physical unit 101, 102, when the unit-to-unit link fails. FIG. 16 is a flowchart showing a process in the unit-to-unit data forwarding section 108 when the physical unit 101, 102 receives the LA relay packet. FIG. 17 is a flowchart showing a process for relaying the packet to the physical unit having the system state as designated by the transmitting destination apparatus type 502 within the header when the LA relay packet is received in the subordinate apparatus.

(Forwarding of Virtualization Control Packet)

Figure 18:
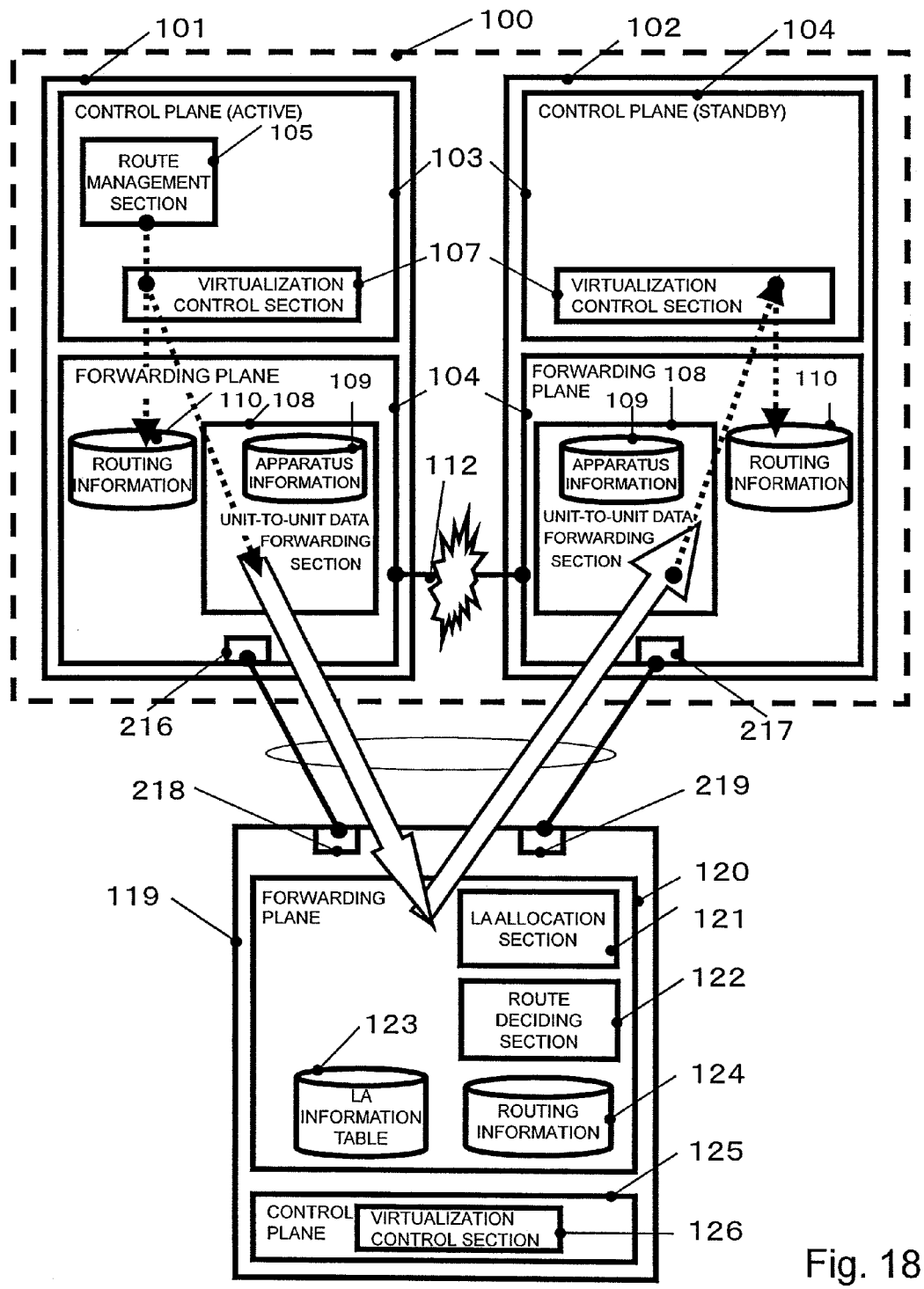
FIG. 18 is an explanatory view showing one example of a virtualization control packet transmitting process when the unit-to-unit link fails in the first example of the invention.

FIG. 18 is an explanatory view showing one example of a virtualization control packet transmitting process when the unit-to-unit link fails.

A method for forwarding the virtualization control packet when the unit-to-unit link fails in the first example will be described below by way of example. In this example with the network configuration as shown in FIG. 4, the virtualization control packet is transmitted from the active system to the standby system in making the route synchronization as shown in FIG. 18. In the physical unit 101 operating as the active system in the virtual machine 100, if the route management section 105 learns the new route, it notifies the route information to the virtualization control section 107. The virtualization control section 107 registers the route in the routing information 110, and instructs the unit-to-unit data forwarding section 108 to transmit the routing information via the unit-to-unit link 112 to the standby physical unit 102. First of all, a process in the unit-to-unit data forwarding section 108 is shown in FIG. 15.

The unit-to-unit data forwarding section 108 receives a packet transmitting instruction via the unit-to-unit link 112 from the virtualization control section 107, for example (step 403). The unit-to-unit data forwarding section 108 acquires the apparatus type of the self-unit by referring to the apparatus information table 109 possessed by itself. According to the apparatus type, the following process branches into two (step 404). If the apparatus type of the self-unit is active, the information indicating "active" is stored in the transmitting source apparatus type 501 and the information indicating "standby" is stored in the transmitting destination apparatus type 502 for the LA relay header as shown in FIG. 12. Using the example as shown in FIG. 13, "00" in binary is stored in the transmitting source apparatus type 501 and "01" in binary is stored in the transmitting destination apparatus type 502 (step 405-a). On the other hand, if the apparatus type of the self-unit is standby, the information indicating "standby" is stored in the transmitting source apparatus type 501 and the information indicating "active" is stored in the transmitting destination apparatus type 502 (step 405-b). In the example of FIG. 18, since the apparatus type of the physical unit 101 is active, the operation branches to step 405-a.

After the LA relay header is generated at step 405-a, the process branches, depending on whether the packet transmitting instruction source to the unit-to-unit data forwarding section is the virtualization control section 107 or the route deciding section 111 (step 406). In the example of FIG. 18, since the instruction source is the virtualization control section 105, the packet, to which the LA relay header is added, is transmitted to any port on the unit spanning LA of the self-unit (step 408-*a*). In the example of FIG. 18, the unit-to-unit data forwarding section 108 selects the port 216 as the output target port, and transmits the LA relay packet to the subordinate apparatus 119.

The subordinate apparatus 119 receives the LA relay packet from the physical unit 101, and requests the forwarding plane 120 to perform the process. The operation of the forwarding plane 120 in receiving the LA relay packet will be described below along FIG. 17.

If the LA relay packet is received from any one of the physical units 101 and 102 connected via the unit spanning LA, the receiving process is started in the forwarding plane 120 (step 413). The forwarding plane 120 searches the LA information table 123 with the number of the port receiving the LA relay packet as the key and acquires the LA group number of the unit spanning LA connected to the virtual machine 100 (step 414). Then, the process branches into two, depending on whether the transmitting destination apparatus type 502 included within the header of the received LA relay packet is active or standby (step 415). If it is active, the forwarding plane 120 searches the LA information table 123 again, and selects the physical port having the LA group number obtained at step 412 and data in which the system state of the connection target apparatus is active (step 416-*a*). On the other hand, if it is standby, the forwarding plane 120 searches the LA information table 123 again, and selects the physical port having the LA group number obtained at step 412 and data in which the system state of the connection target apparatus is standby (step 416-*b*). In the example of FIG. 18, since the transmitting destination apparatus type 502 is standby, step 416-*b* is executed, whereby the port 219 is selected as the physical port number. Step 437 after steps 416-*a* and 416-*b* is not performed in the first example. Step 437 will be described later in C. third example. Finally, the received LA relay packet is relayed to the physical port number obtained at step 416-*a* or 416-*b* (step 417).

The physical unit 102 receives the LA relay packet from the subordinate apparatus 119. The operation of the physical unit 102 at this time will be described below along FIG. 16.

The unit-to-unit data forwarding section 108 of the physical unit 102 receives an instruction of performing the receiving process for the LA relay packet from the forwarding plane 104 (step 409). The unit-to-unit data forwarding section 108 confirms the transmitting destination apparatus type 502 of the LA relay header, whereby the process branches into two, depending on whether the transmitting destination apparatus type 502 is active or standby, or any other value (step 410). If any other value is stored, the packet is discarded, for example. If the system is active or standby, it is checked whether the transmitting destination apparatus type 502 within the LA relay header and the system state of the self-unit stored in the table indicated by the apparatus information table 109 of the unit-to-unit data forwarding section 108 are matched (step 411). In the example of FIG. 18, since they are matched with "standby", the operation proceeds to the following step. If unmatched, the packet is discarded, for example. Finally, the LA relay packet is de-capsulated, and the same receiving process is performed for the taken-out packet as when using the unit-to-unit link (step 412).

With the method as described using the example of FIG. 18, since the virtualization control packet can be exchanged between the physical units after the unit-to-unit link fails, the control of the virtual machine 100 can be maintained. Hence, the communication not via the unit-to-unit link can be maintained by the above method, as shown in FIG. 4 and described in A-2.

(Forwarding 1 of Unit Passing Data Packet)

To enable the virtual machine 100 to perform the same operation as before the unit-to-unit link fails, it is necessary to have a method for communicating the unit passing data packet via the unit-to-unit link between the physical units, using the alternate apparatus, as shown in FIG. 7. In the following, a method for forwarding the unit passing data packet when the unit-to-unit link fails will be described below.

Figure 19:
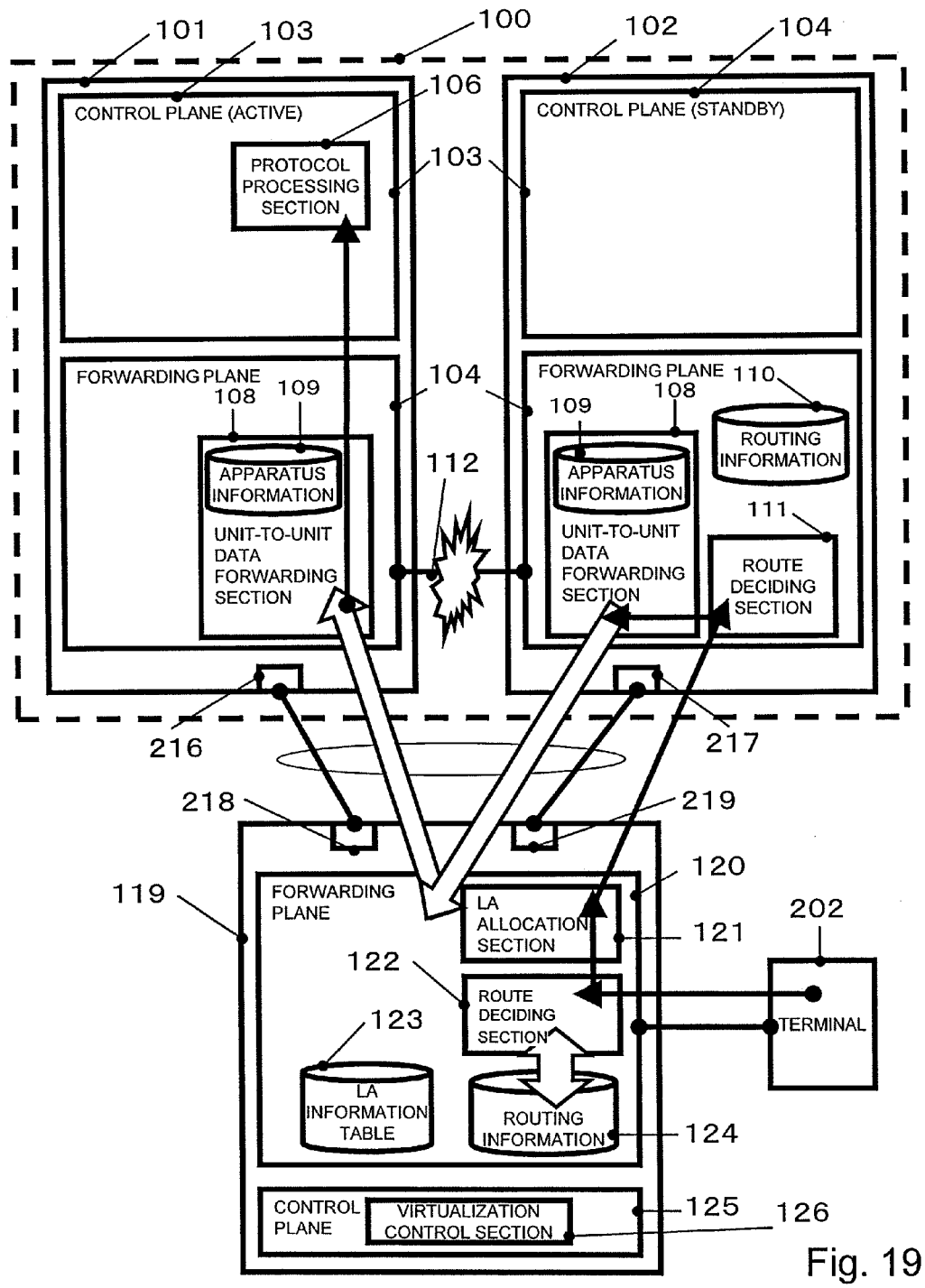
FIG. 19 is an explanatory view showing a forwarding operation to the active apparatus when a packet destined to the virtual machine is transmitted to the standby physical unit in the first example of the invention.

FIG. 19 is an explanatory view showing the forwarding operation to the active apparatus when the data packet destined to the virtual machine is transmitted to the standby physical unit. A method for forwarding the unit passing data packet to the active physical unit when the data packet destined to the virtual machine 100 is transmitted to the standby physical unit will be described below, using the example as shown in FIG. 19. The terminal 202 transmits the packet having the address of the virtual machine 100 as the destination address, and the forwarding plane 120 of the subordinate apparatus 119 receives it. The forwarding plane 120 instructs the route deciding section 122 to perform the process for the received packet. The route deciding section 122 searches the routing information 124, and selects the LA port composed of the ports 218 and 219 as the output target port. The route deciding section 122 instructs the LA allocation section 121 to allocate the packet. The LA allocation section 121 selects the port 218 or 219 to which the packet is allocated by referring to the header information of the packet and using a specific algorithm. As a result of the LA allocation process, if the port 219 is selected, the packet is transmitted to the physical unit 102.

The physical unit 102 receives the packet from the port 217, and performs the relay process in the forwarding plane 104. The forwarding plane 104 instructs the route deciding section 111 to perform the packet process, and performs the route search by referring to the routing information 110. As a result, it is found that the received packet is destined to the virtual machine 100, and needs to be processed in the control plane 103 of the active physical unit 101. The route deciding section 111 instructs the unit-to-unit data forwarding section 108 to perform the packet process to transmit the data packet to the physical unit 101.

A process in the unit-to-unit data forwarding section 108 will be described below along FIG. 15. The unit-to-unit data forwarding section 108 on the standby physical unit 102 receives a packet transmitting instruction from the route deciding section 111 via the unit-to-unit link 112 (step 403). The unit-to-unit data forwarding section 108 acquires that the apparatus type of the self-unit is "standby" by referring to the apparatus information table 109 possessed by the self-unit (step 404). If the apparatus type is standby, the unit-to-unit data forwarding section 108 stores the information indicating "standby" in the transmitting source apparatus type 501 of the LA relay header and stores the information indicating "active" in the transmitting destination apparatus type 502 (step 405-*b*). Then, the process branches into two, depending on the transmitting instruction source. In the example of FIG. 19, since the instruction source is the route deciding section 111, the operation goes to step 407 (step 406). The unit-to-unit data forwarding section 108 determines whether the port (hereinafter a packet receiving port) at which the forwarding plane 104 receives the packet is the port on the unit spanning LA or not, using the setting information such as configuration, whereby the process branches depending on the determination result (step 407). If the packet receiving port is the port on the unit spanning LA, the unit-to-unit data forwarding section 108 adds the LA relay header created at step 405-*b* to the packet and outputs the LA relay packet to the packet receiving port (step 408-b). On the other hand, if it is not the port on the unit spanning LA, the unit-to-unit data forwarding section 108 adds the LA relay header to the packet and outputs it to any port of the unit spanning LA ports of the self-unit (step 408-a). In the example of FIG. 19, since the packet receiving port is the port 217 and it is preset that the port 217 is the port on the unit spanning LA, step 408-b is executed, whereby the LA relay header is added to the received packet and the LA relay packet is outputted to the port 217. The LA relay packet arrives at the subordinate apparatus 119 through the above process.

The subordinate apparatus 119 receives the LA relay packet from the physical unit 102, and instructs the forwarding plane 120 to perform the packet process. A process in the forwarding plane 120 will be described below along FIG. 17. The subordinate apparatus 119 receives the LA relay packet from the physical unit 102, and starts the receiving process in the forwarding plane 120 (step 413). The forwarding plane 120 searches the LA information table 123 with the port number of the port 219 receiving the LA relay packet as the key, and acquires the LA group number to which the port 219 belongs (step 414). Then, it is determined that the transmitting destination apparatus type 502 included within the header of the received LA relay packet is "active" (step 415). The forwarding plane 120 searches the LA information table 123 again for the physical port having the LA group number obtained at step 414 and data in which the system state of the connection target apparatus is active, and selects the port 218 (step 416-a). Finally, the LA relay packet is transmitted to the selected port 218 (step 417).

The forwarding plane 104 of the physical unit 101 receives the LA relay packet relayed by the subordinate apparatus 119, and instructs the unit-to-unit data forwarding section 108 to perform the packet process. A receiving process in the unit-to-unit data forwarding section 108 will be described below along FIG. 16. The unit-to-unit data forwarding section 108 receives an instruction of performing the receiving process for the LA relay packet from the forwarding plane 104 (step 409). The unit-to-unit data forwarding section 108 confirms the transmitting destination apparatus type of the LA relay header, and determines that the transmitting destination apparatus type is "active", whereby the operation proceeds to the following step (step 410). After confirming that the transmitting destination apparatus type within the LA relay header and the system state of the self-unit stored in the table as indicated in the apparatus information table 109 are matched with "active", the operation proceeds to the following step (step 411). Finally, the LA relay packet is de-capsulated, and the packet is taken out, whereby the same receiving process is performed as when using the unit-to-unit link 112 (step 412).

(Forwarding 2 of Unit Passing Data Packet)

Figure 20:
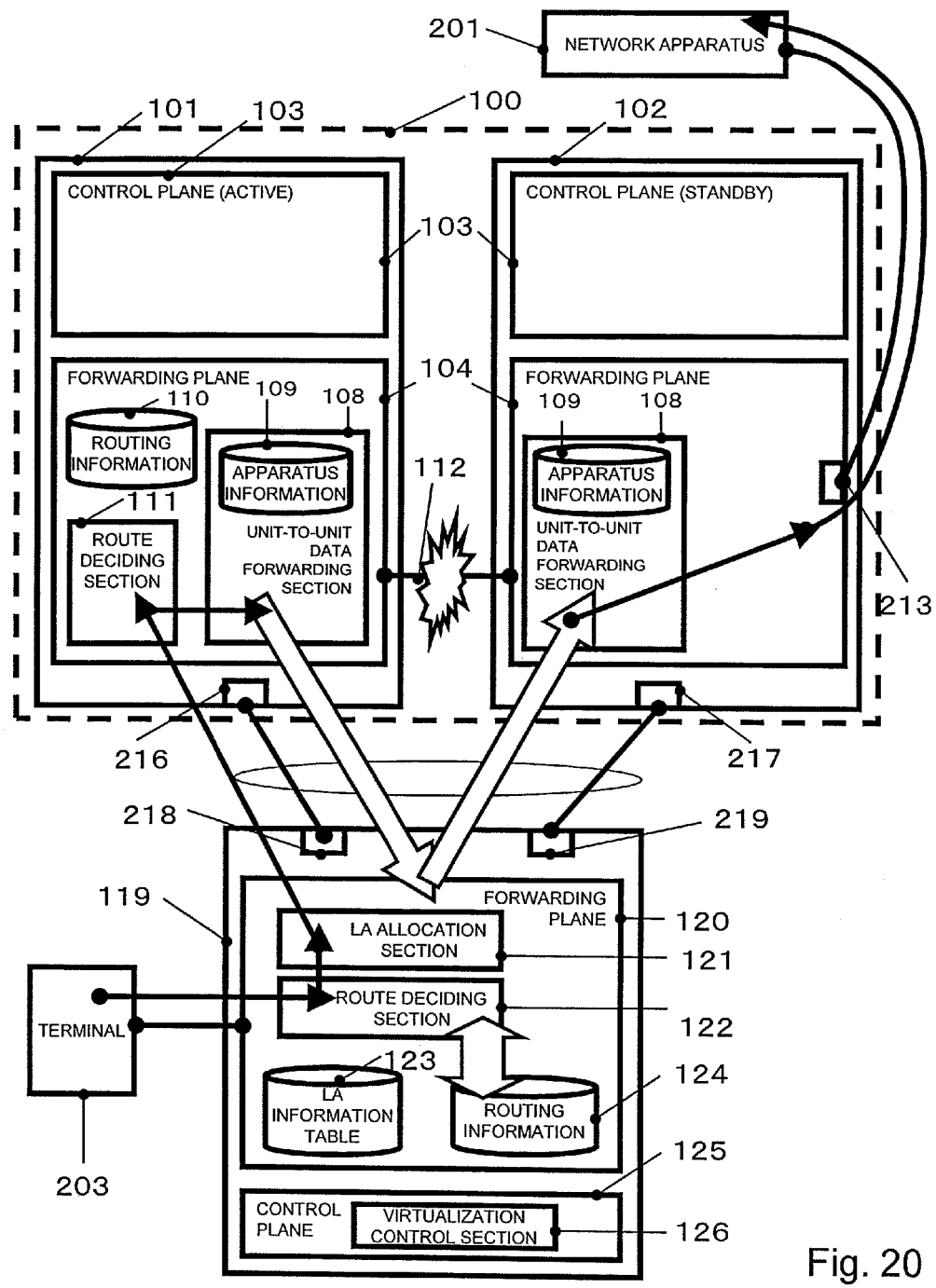
FIG. 20 is an explanatory view showing the forwarding operation for a packet not destined to the virtual machine between the physical units in the first example of the invention.

A method for forwarding the unit passing data packet where the data packet relayed to the network apparatus connected to one physical unit is relayed to the other physical unit will be described below using an example as shown in FIG. 20. The terminal 203 transmits a packet having the apparatus (not shown) on the network before the network apparatus 201 as the destination address. The subordinate apparatus 119 receiving this packet performs the route search and the LA allocation in the same way as shown in FIG. 19, wherein it is assumed that the packet is transmitted from the port 218. The physical unit 101 receives the packet from the subordinate apparatus 119 at the port 216, and decides the port 213 on the physical unit 102 as the output target port by referring to the routing information 110 in the route deciding section 111. Since the output target port is other than the self-unit, the route deciding section 111 instructs the unit-to-unit data forwarding section 108 to transmit the packet to the physical unit 102.

A process in the unit-to-unit data forwarding section 108 receiving this packet will be described below along FIG. 15. The unit-to-unit data forwarding section 108 receives a packet transmitting instruction via the unit-to-unit link 112 from the route deciding section 111 (step 403). The unit-to-unit data forwarding section 108 acquires that the apparatus type of the self-unit is "active" by referring to the apparatus information table 109 possessed by itself (step 404). If the apparatus type is active, the information indicating "active" is stored in the transmitting source apparatus type 501 and the information indicating "standby" is stored in the transmitting destination apparatus type 502 for the LA relay header shown in FIG. 12 (step 405-a). Since the transmitting instruction source is the route deciding section 111 in FIG. 20, the operation goes to step 407 (step 406). Since the packet receiving port is the port 216 and located on the unit spanning LA, the operation proceeds to step 408-b (step 407). Finally, the LA relay header created at step 405-a is added to the received packet and outputted to the port 216 that is the packet receiving port (step 408-a). The LA relay packet arrives at the subordinate apparatus 119 through the above process.

The subordinate apparatus 119 receives the LA relay packet at the port 218, and instructs the forwarding plane 120 to perform the packet process. A process for relaying the LA relay packet in the forwarding plane 120 will be described below along FIG. 17. The subordinate apparatus 119 receives the LA relay packet from the physical unit 101, and starts the receiving process in the forwarding plane 120 (step 413). The forwarding plane 120 searches the LA information table 123 with the port number of the port 218 receiving the LA relay packet as the key and acquires the LA group number (step 414). Then, it is determined that the transmitting destination apparatus type 502 included within the header of the received LA relay packet is "standby" (step 415). If the transmitting destination apparatus type 502 is standby, the forwarding plane 120 searches the LA information table 123 again for the physical port having the LA group number obtained at step 412 and data in which the system state of the connection target apparatus is standby to select the port 219 (step 416-b). Finally, the LA relay packet is relayed to the port 219 (step 417).

The forwarding plane 104 of the physical unit 102 receives the LA relay packet transmitted from the subordinate apparatus 119, and instructs the unit-to-unit data forwarding section 108 to perform the process. An LA relay packet receiving process in the unit-to-unit data forwarding section 108 is shown in FIG. 16. The unit-to-unit data forwarding section 108 receives an instruction of performing the receiving process for the LA relay packet from the forwarding plane 104 (step 409). The unit-to-unit data forwarding section 108 confirms the transmitting destination apparatus type of the LA relay header and determines that it is "standby", whereby the process proceeds to the following step (step 410). Then, it is determined that the transmitting destination apparatus type within the LA relay header and the system state of the self-unit stored in the table indicated by the apparatus information table 109 are matched with "standby", and the operation proceeds to the next step (step 411). Finally, the LA relay packet is de-capsulated, and the packet is taken out, whereby the same receiving process is performed for the packet as when using the unit-to-unit link (step 412).

A-4. Effects of the Example

With the first example, even when a fault occurs in the unit-to-unit link 112, the virtualization packet is relayed by the subordinate apparatus using the unit spanning LA line, whereby it is possible to continue to communicate the virtualization packet between the physical units. Thereby, it is unnecessary to take a workaround of shutting down all the ports of one physical unit, so that the physical units 101 and 102 can be continuously operated as the virtual machine 100.

When the unit-to-unit link fails, each physical unit can continue to operate while the system state is kept, whereby it is possible to solve the previously-mentioned problem (1) that the forwarding capability is reduced by half. Further, since it is unnecessary to shut down all the ports of one physical unit, it is possible to solve the previously-mentioned problem (2) that the communication with the apparatus not connected to each physical unit via the unit spanning LA is disconnected.

B. Second Example

The first example is the method for encapsulating the virtualization packet communicated between the physical units with the LA relay header and transmitting the packet via the unit spanning LA line when the unit-to-unit link fails. However, in the first example, when the traffic of the unit passing data packet increases due to a situation of LA allocation from the subordinate apparatus to the virtual machine, the band of the unit spanning LA line may be pressed by the LA relay packet, so that the forwarding capability may be lower than at the normal time.

A second example is a method in which among the unit passing data packets encapsulated in the LA relay packets and transmitted via the unit spanning LA, the virtual machine destined data packet (see FIG. 19 of the first example) transmitted from the standby system to the active system is forcefully allocated to the active system in the subordinate apparatus to dispense with the unit passing data packet, thereby solving the problem of the first example. In the second example, the address information possessed by the virtual machine is acquired in the subordinate apparatus, and held as the table in the forwarding plane of the self-unit. This address information is called information of the virtual machine address. In relaying the packet destined to the virtual machine in the forwarding plane of the subordinate apparatus, the information of the virtual machine address and the information of the LA information table used in the first example are combined and the packet destined to the virtual machine is transmitted to the active physical unit by ignoring the LA allocation process, thereby making it possible to decrease the LA relay packets including the unit passing data packet, and reduce the pressure on the band of the unit spanning LA line.

B-1. Configuration of the Example

Figure 21:
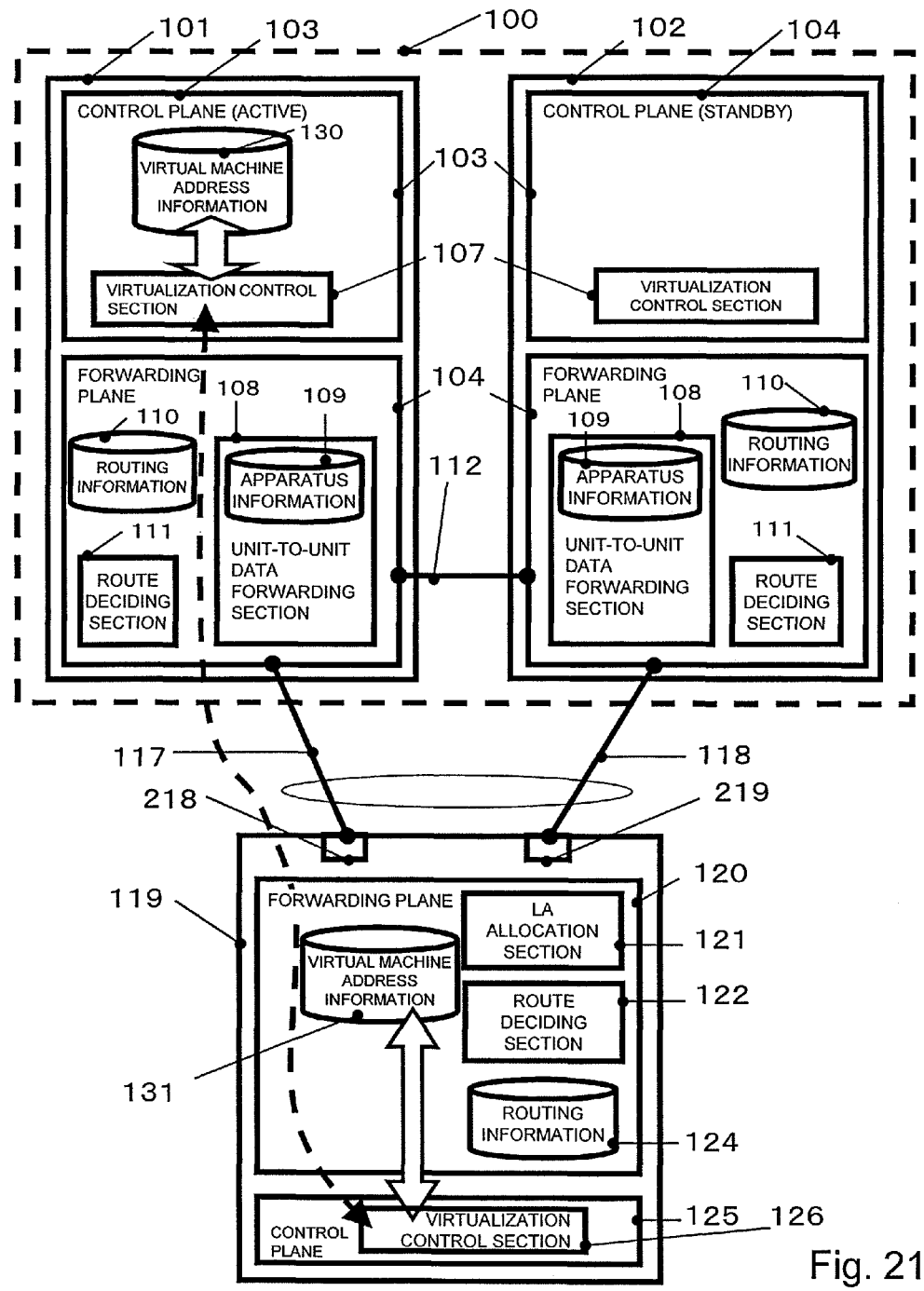
FIG. 21 is an explanatory view showing a schematic configuration in a second example.

FIG. 21 shows a schematic configuration of the second example.

In addition to the configuration of the first example, a virtual machine address information table 130 is arranged in the control plane of the active physical unit 101. This table is a list of layer 2 and layer 3 addresses assigned to the whole of the virtual machine 100. In the subordinate apparatus 119, a virtual machine address information table 131 is added to the forwarding plane 120. This table stores the same information as the virtual machine address information table 130 possessed by the active physical unit 101. A method for creating the virtual machine address information table 131 in the subordinate apparatus 119 will be detailed later in B-2.

B-2. Operation when the Unit-to-Unit Link is Normal

If the unit-to-unit link is normal and there is no fault in the system, the relay process for data packet is not different from the first example, whereby its explanation is omitted here.

A method for adding the virtual machine address information table 131 in the subordinate apparatus 119 will be described below using FIG. 21. The virtualization control section 107 on the active physical unit 101 transmits the virtual machine address information table 130 as the LA relay packet to the subordinate apparatus 119, in starting the operation as the active system of the virtual machine by configuration. The subordinate apparatus 119 receiving this LA relay packet performs the process in the virtualization control section 126. The virtualization control section 126 adds the address information included in the packet to the virtual machine address information table 131 of the self-unit.

Figure 22:
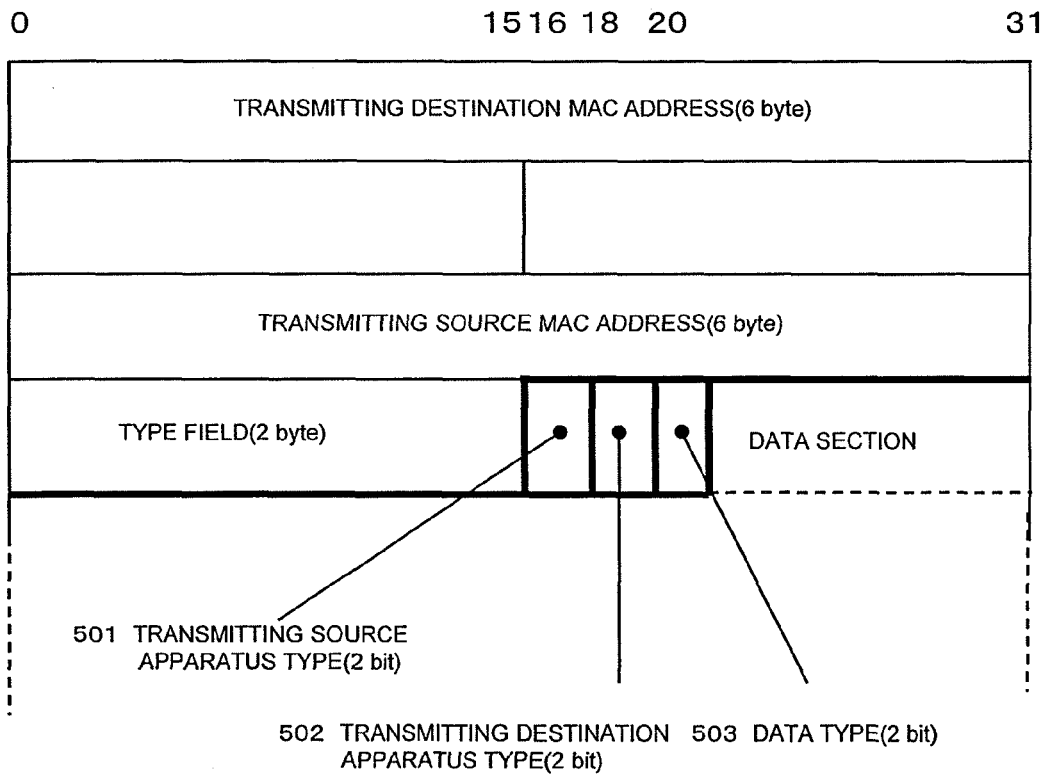
FIG. 22 is an explanatory view showing the frame format of an LA relay packet in the second example.

FIG. 22 shows the frame format of the LA relay packet for use in transmitting information of the virtual machine address. The transmitting source apparatus type 501 and the transmitting destination apparatus type 502 store the values of identifying the "active", "standby" and "subordinate apparatus" as in the first example. In transmitting the information of the virtual machine address, the value indicating the "active" is stored in the transmitting source apparatus type 501 and the value indicating the "subordinate apparatus" is stored in the transmitting destination apparatus type 502. The data type 503 stores the type of data stored after the LA relay header. In the second example, three data types of "virtual machine address information", "virtualization control packet" and "unit passing data packet" are assigned to the 2-bit fields, as exemplified in FIG. 23.

Figure 24:
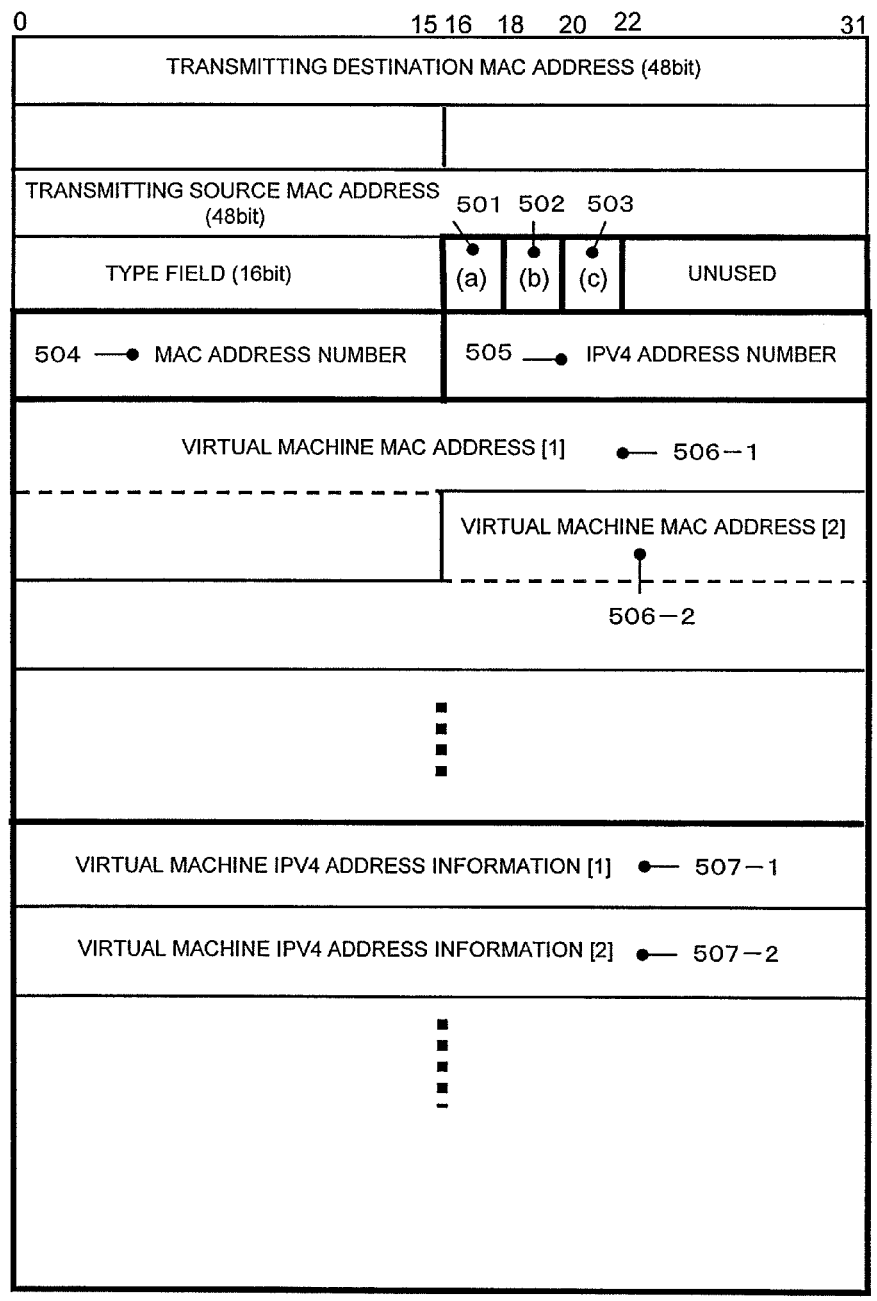
FIG. 24 is an explanatory view showing the frame format of the LA relay packet storing the virtual machine address information in the second example of the invention.

FIG. 24 shows an example of storing the information of the virtual machine address in the LA relay packet. Herein, the layer 2 protocol uses the Ethernet II and the layer 3 protocol uses the IPv4. Following the LA relay header as shown in FIG. 22, a MAC address number 504 and an IPv4 address number 505 included in the packet are stored. In FIG. 24, an unused area of 10 bits is provided directly after the IPv4 address number 505 as an example, though this area is intended to simplify the software process within the apparatus and may be deleted, if unnecessary. Following this area, the MAC addresses 506-1, 506-2, . . . corresponding to the number of addresses as indicated in the MAC address number 504 are stored. Following the MAC addresses, the IPv4 addresses 507-1, 507-2, . . . corresponding to the number of addresses as indicated in the IPv4 address number 505 are stored. When other layer 2 and layer 3 protocol is used, the information stored in the MAC address and IPv4 address information field is changed according to the protocol for use. If the information of the virtual machine address is large, there is possibility that the packet size that can be transmitted at a time is exceeded in the line connecting the physical unit and the subordinate apparatus. In this case, the packet is fragmented and divided into the transmittable size, and transmitted. On this occasion, the information for fragmenting the packet is stored in its own control header. A fragmentation process may be the same as the fragmentation performed in the IP protocol. In this case, the information equivalent to the fragment information within the IP header is added to the header.

FIGS. 25A and 25B show examples of the virtual machine address information table 131 held in the subordinate apparatus 119. In the case where the virtual machine 100 holds 255 IPv4 addresses and 255 MAC addresses, the table is created as shown in FIGS. 25A and 25B. The virtual machine address information table 131 is divided into information of the layer 3 address and information of the layer 2 address, which are called a layer 3 address table 131-1 and a layer 2 address table 131-2, respectively. In the second example, the IPv4 address table is prepared as the layer 3 address table 131-1 and the MAC address table is prepared as the layer 2 address table 131-2. In a packet relay process in the subordinate apparatus as will be described later, which of the tables to search is decided depending on the layer 2 relay or layer 3 relay.

Except for the initialization time of the virtual machine address information table 130 and the virtual machine 100, the virtual machine address information table 130 is transmitted from the active physical unit to the subordinate apparatus 119 at the moment when the address information is changed by changing the configuration, or the like. The virtualization control section 126 of the subordinate apparatus 119 updates the virtual machine address information table 131 of the self-unit every time of receiving the information of the virtual machine address.

B-3. Operation when the Unit-to-Unit Link Fails

Figure 26:
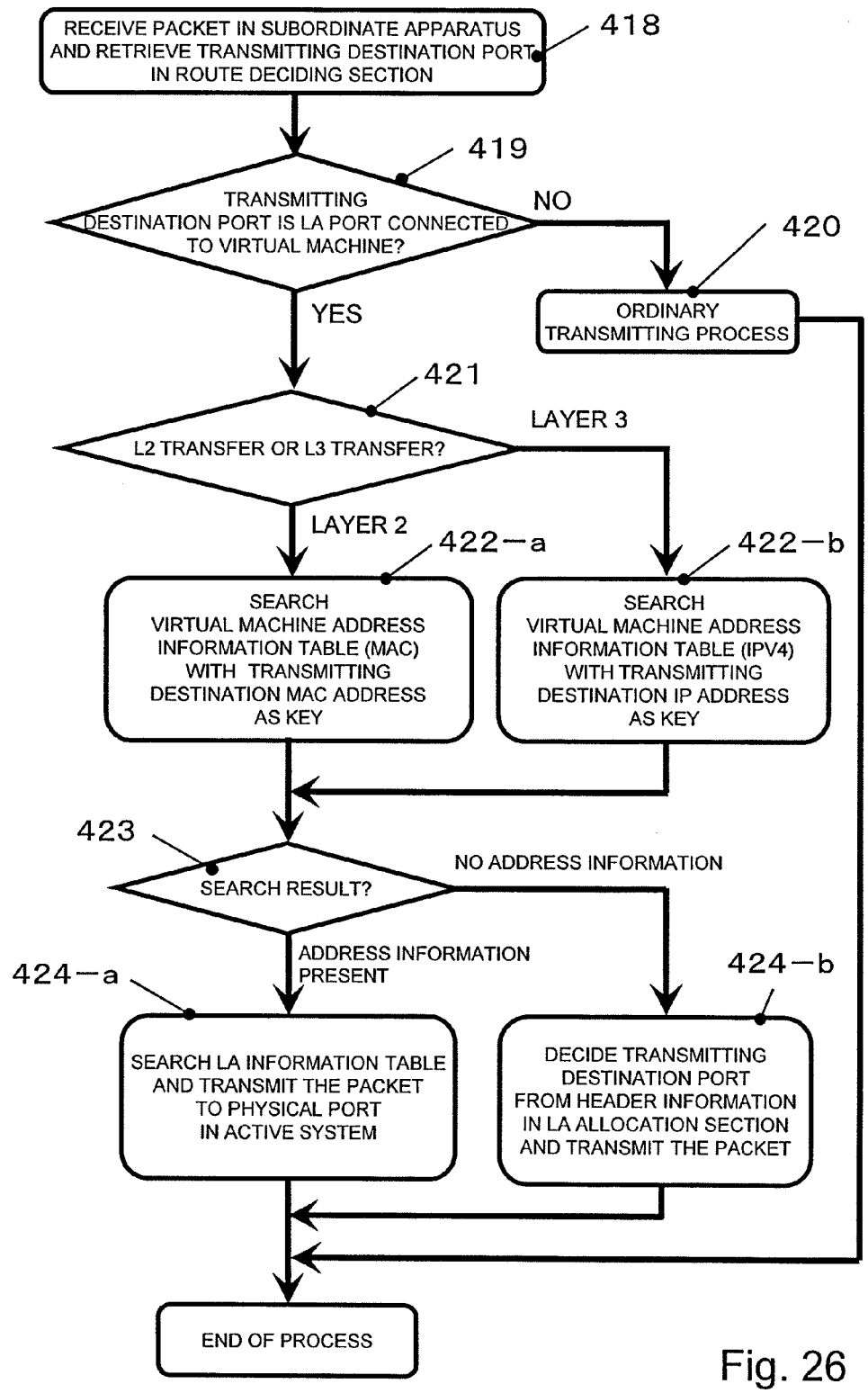
FIG. 26 is a flowchart showing the procedure of a packet forwarding process in the subordinate apparatus in the second example of the invention.

FIG. 26 is a flowchart showing the packet relay process in the subordinate apparatus when the unit-to-unit link 112 fails.

Figure 27:
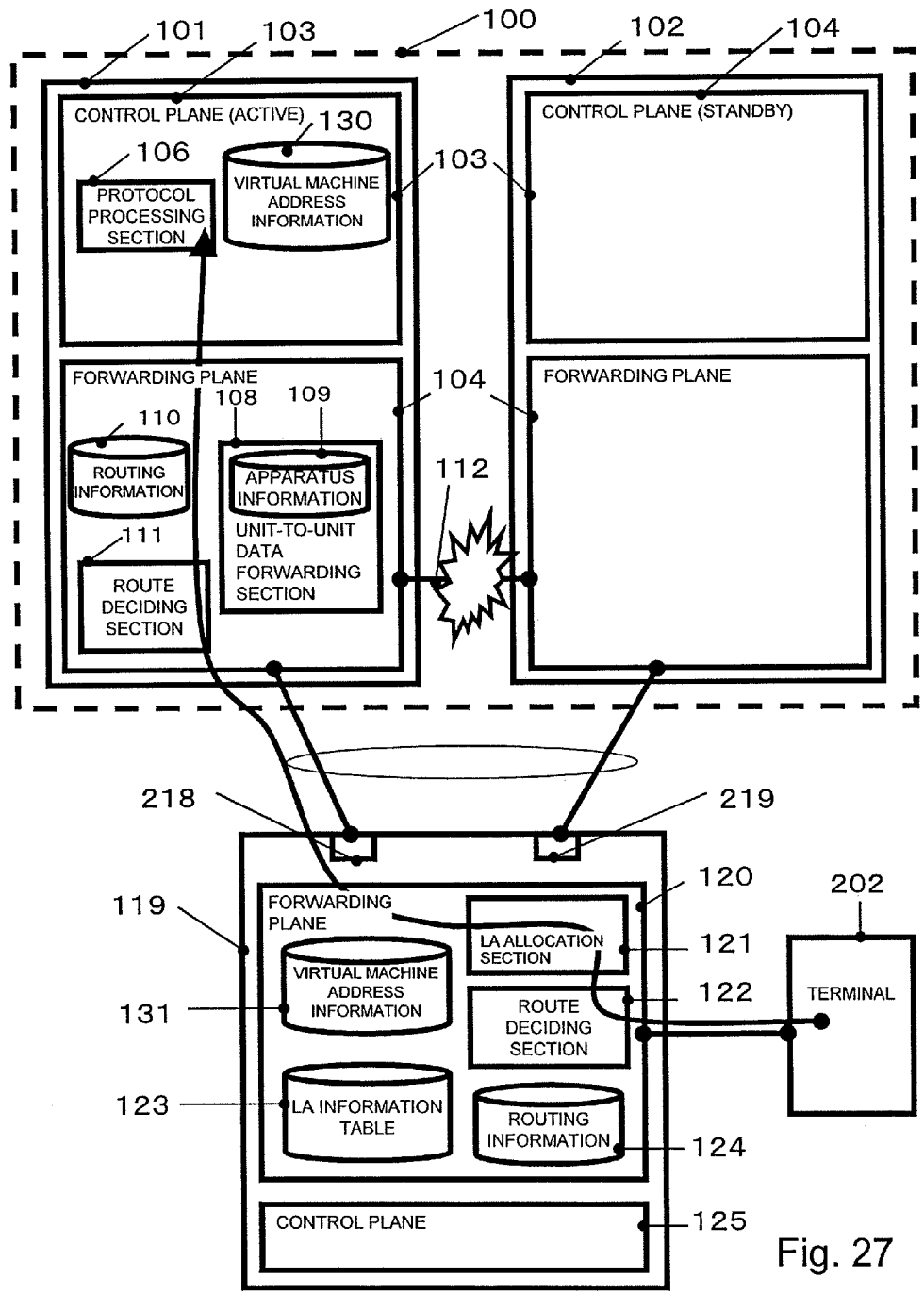
FIG. 27 is an explanatory view showing the operation of a relaying process for a packet destined to the virtual machine when the unit-to-unit link fails in the second example of the invention.

FIG. 27 is an explanatory view for explaining the relay process for the virtual machine destined data packet when the unit-to-unit link fails in the second example. The terminal 202 transmits the packet destined to the virtual machine 100 to the subordinate apparatus 119. A packet forwarding process of the subordinate apparatus 119 will be described below along FIG. 26. The subordinate apparatus 119 receiving the packet searches the routing information 124 for the destination port in the route deciding section 122 (step 418). The process branches into two, depending on whether the destination port of the search result is the LA port connected to the virtual machine or not (step 419). If the destination port is not the LA port connected to the virtual machine 100, the subordinate apparatus 119 performs the normal packet forwarding process (as in FIG. 6) and ends the relay process (step 420). On the other hand, if the destination port is the LA port connected to the virtual machine 100, the process branches, depending on whether the layer 2 forwarding or the layer 3 forwarding is determined by the route deciding section 122 (step 421). If the layer 2 forwarding is determined, the subordinate apparatus 119 searches the layer 2 table 131-2 of the virtual machine address information table 131 with the destination MAC address stored in the header of the received packet as the key (step 422-*a*). Also, if the layer 3 forwarding is determined, the subordinate apparatus 119 searches the layer 3 table 131-1 of the virtual machine address information table 131 with the destination IP address stored in the header of the received packet as the key (step 422-*b*). The process branches into two, depending on whether the address information matched with the destination address is included (address information present), or not included (no address information) by searching at step 422-*a* or step 422-*b* (step 423). If the address information is present, the LA information table 123 is confirmed in the LA allocation section 121, and the physical port connected to the active physical unit 101 is selected on the LA port at the destination, whereby the packet is transmitted (step 424-*a*). If the address information is not present, the destination port is decided based on the header information in the LA allocation section 121, and the packet is transmitted (step 424-*b*). In the example of FIG. 27, step 424-*a* is performed, and the port 218 is selected. The subordinate apparatus 119 transmits the packet from the port 218, and the active physical unit 101 processes this packet in the route deciding section 111. In the route deciding section 111, the destination of the received packet is determined as the virtual machine, and the protocol processing section 106 for receiving the packet is selected based on the header information (such as the port number of the TCP/UDP header) and instructed to receive the packet.

B-4. Effects of the Example

In the second example, when receiving the virtual machine destined packet to be processed in the active physical unit, the subordinate apparatus transmits the packet to the physical line on the unit spanning LA connected to the active physical unit by ignoring the LA allocation process. Owing to this process, it is unnecessary that the unit passing data packet from the standby system to the active system is encapsulated with the LA relay header and transmitted when the virtual link fails. Hence, by combining the second example with the first example, it is possible to reduce the influence on the band of the unit spanning LA line caused by the increased LA relay packets, which is the problem of the first embodiment.

C. Third Example

A third example is a method for relieving the pressure on the band of the unit spanning LA line, which is the problem of the first example, by combination with the first example. In the third example, when receiving the LA relay packet in which the unit passing data packet is encapsulated, the subordinate apparatus manages information of the destination address of the encapsulated packet and the information of the transmitting destination apparatus type included in the LA relay header together as an LA exception table. In the subordinate apparatus, after the LA exception table is registered, in relaying the packet to the same destination as the encapsulated packet, the LA exception table is searched with the destination address of the packet as the key, whereby the packet is transmitted to the physical unit that does not need the encapsulation. Thereby, it is possible to dispense with the encapsulation of the data packet after adding it to the LA exception table and reduce the pressure on the band of the unit spanning LA line with the LA relay packet.

C-1. Configuration of the Example

Figure 28:
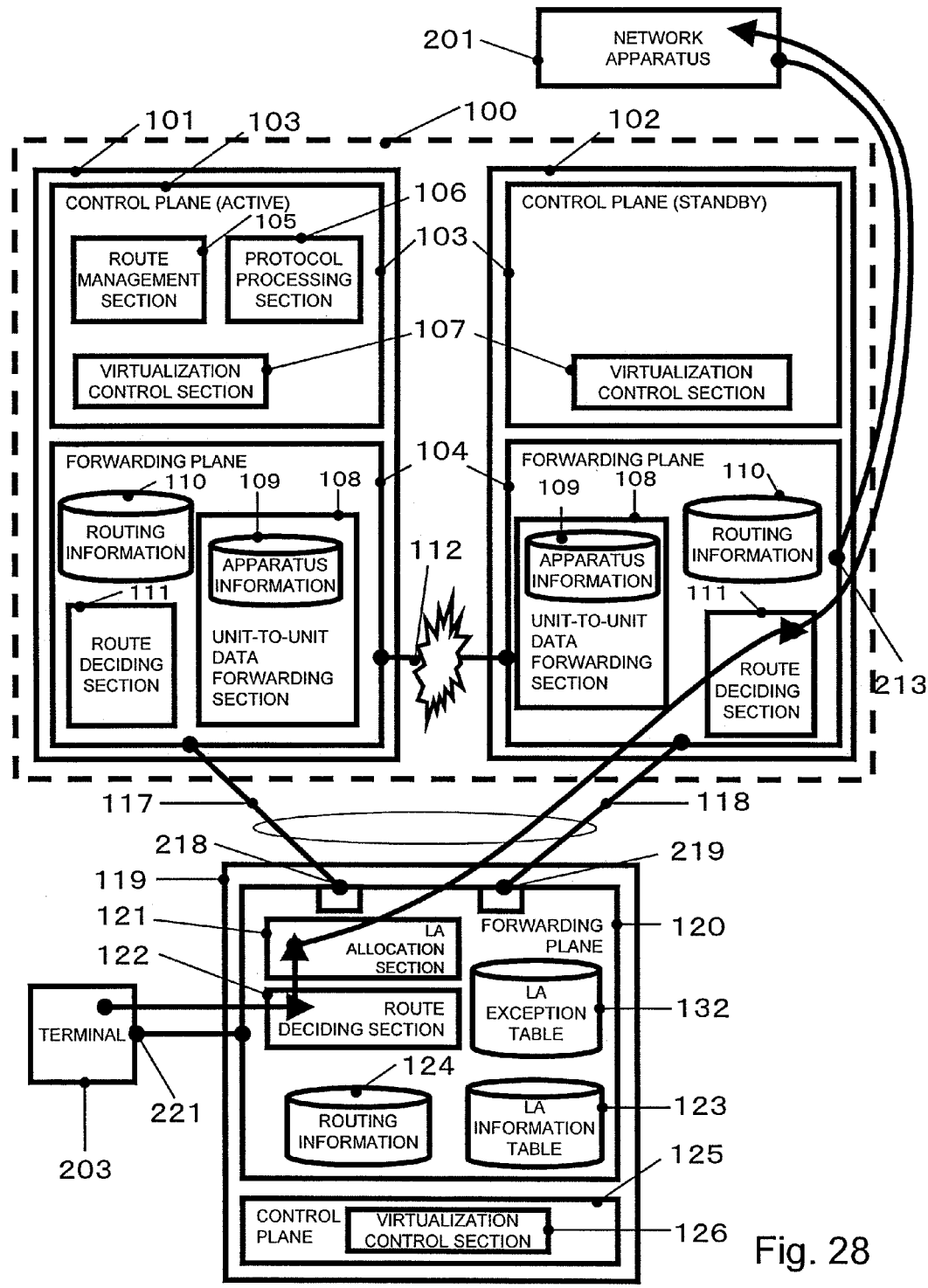
FIG. 28 is an explanatory view showing a schematic configuration in a third example of the invention.

FIG. 28 shows a schematic configuration of the third example. In addition to the configuration of the first example, the LA exception table 132 is added to the forwarding plane 120 on the subordinate apparatus 119. In receiving the LA relay packet in which the unit passing data packet is encapsulated from the physical unit 101 or 102, the forwarding plane takes the destination address out of the header information of the encapsulated packet and registers it in the LA exception table. At this time, the information of the transmitting destination apparatus type 502 included in the LA relay header is also confirmed. A method for creating the LA exception table will be detailed below in C-3.

C-2. Operation when the Unit-to-Unit Link is Normal

When the unit-to-unit link is normal, the virtualization control packet is transmitted or received and the data packet is relayed in the same way as in the first example.

C-3. Operation when the Unit-to-Unit Link Fails

Figure 29:
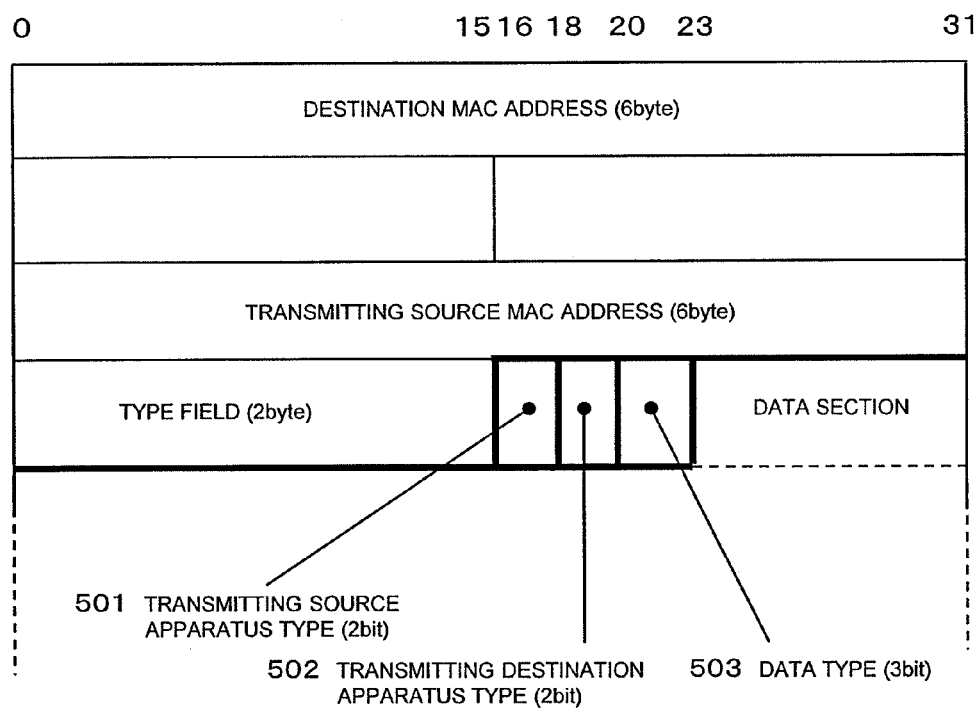
FIG. 29 is an explanatory view showing the frame format of an LA relay packet in the third example of the invention.

FIG. 29 shows the format of an LA relay packet communicated on the unit spanning LA line in the third example. The kind of the encapsulated "unit passing data packet" can be identified in the third example. For example, the unit passing data packets are classified into three, the "data packet destined to other (layer 2 relay)", the "data packet destined to other (layer 3 relay)" and the "data packet destined to itself". Herein, the "destined to itself" designates destined to the virtual machine, and the "destined to other" designates destined to other than the virtual machine. Among these, for the "data packet destined to itself", the second example is used, or the third example is used to perform the same process as the data packet destined to other. In the third example, the data packet destined to itself is not dealt with. FIG. 31 shows an example of the values of the data type 503, including the example of the values of the data type as shown in the second example. As compared with the first example, the values of three bits are required to make use of the second and third examples at the same time as shown in FIG. 31.

Figure 32A:
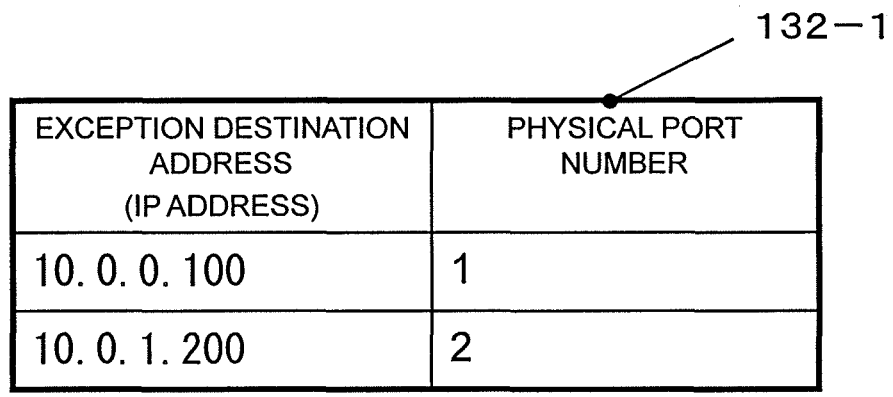
FIGS. 32A and 32B are explanatory views showing one example of the LA exception table in the third example of the invention.
Figure 32B:
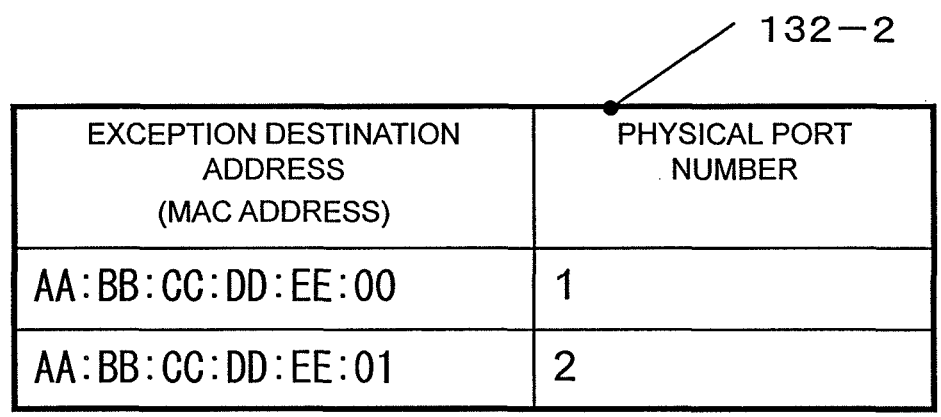

In the third example, when the unit-to-unit link 112 fails, the LA exception table 131 is created in the subordinate apparatus 119 to prevent frequent encapsulation of the data packet. A creation example of the LA exception table is shown in FIGS. 32A and 32B. The LA exception table 131 is divided into a layer 3 address table 132-1 and a layer 2 address table 132-2. In each entry of the table, the "exception transmitting destination address" subjected to the LA exception process and the physical port number" indicating to which port the packet having that address is outputted without making the LA allocation are stored correspondingly.

Figure 30:
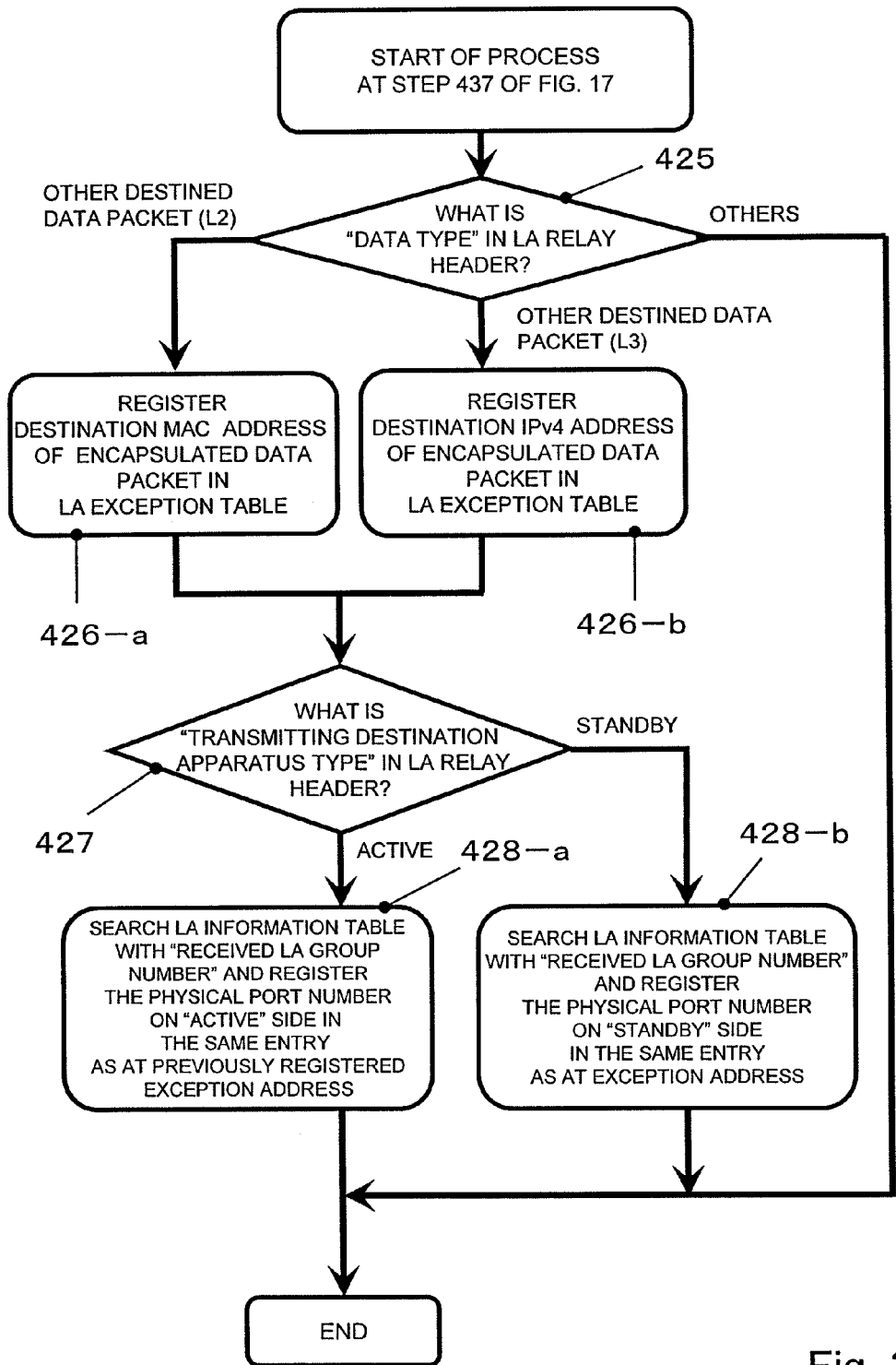
FIG. 30 is a flowchart showing the procedure of a creation process for an LA exception table in the third example of the invention.

In the subordinate apparatus 119, an update process for the LA exception table 132 is performed in performing the relay process for the LA relay packet in the first example. An update method for the LA exception table 132 will be described below along FIG. 30. FIG. 30 is a detailed flowchart showing the processing at step 437 in FIG. 17. The step 437 is the step performed in the third example, and not performed in the case of using the first example.

The subordinate apparatus 119, after performing the process up to step 416-*a* or 416-*b* in FIG. 17, confirms the data type 503 within the LA relay header, and the process branches into three, depending on the "data packet destined to other (layer 2)", the "data packet destined to other (layer 3)" or the "others" (step 425). In the case of the "data packet destined to other (layer 2)", the subordinate apparatus 119 creates a new field in the LA exception table 132-2, and registers the transmitting destination MAC address within the encapsulated data packet in the exception transmitting destination address (MAC address) field. At this time, the physical port number field is made empty (step 426-*b*). In the case of the "data packet destined to other (layer 3)", the subordinate apparatus 119 registers the transmitting destination IP address within the encapsulated data packet in the LA exception table 132-1 (step 426-*b*). In the case of the "others", the process is ended, and step 415 of FIG. 17 is executed. After step 426-*a* or step 426-*b*, the subordinate apparatus 119 confirms the transmitting destination apparatus type 502 within the header, and ascertains the "active" or "standby" (step 427). In the case of "active", the subordinate apparatus 119 searches the LA information table 123 with the LA group number to which the port receiving the packet belongs as the key, acquires the port number of the physical port connected to the active system and registers it in the physical port number field which is made empty at step 426-*a* or step 426-*b* (step 428-*a*). In the case of "standby", the subordinate apparatus 119 searches the LA information table 123 with the LA group number to which the port receiving the packet belongs as the key, acquires the port number of the physical port connected to the standby system and registers it in the physical port number field which is made empty at step 426-*a* or step 426-*b* (step 428-*b*). With the above, the processing at step 437 is completed, and the operation returns to the process of FIG. 17.

Figure 33:
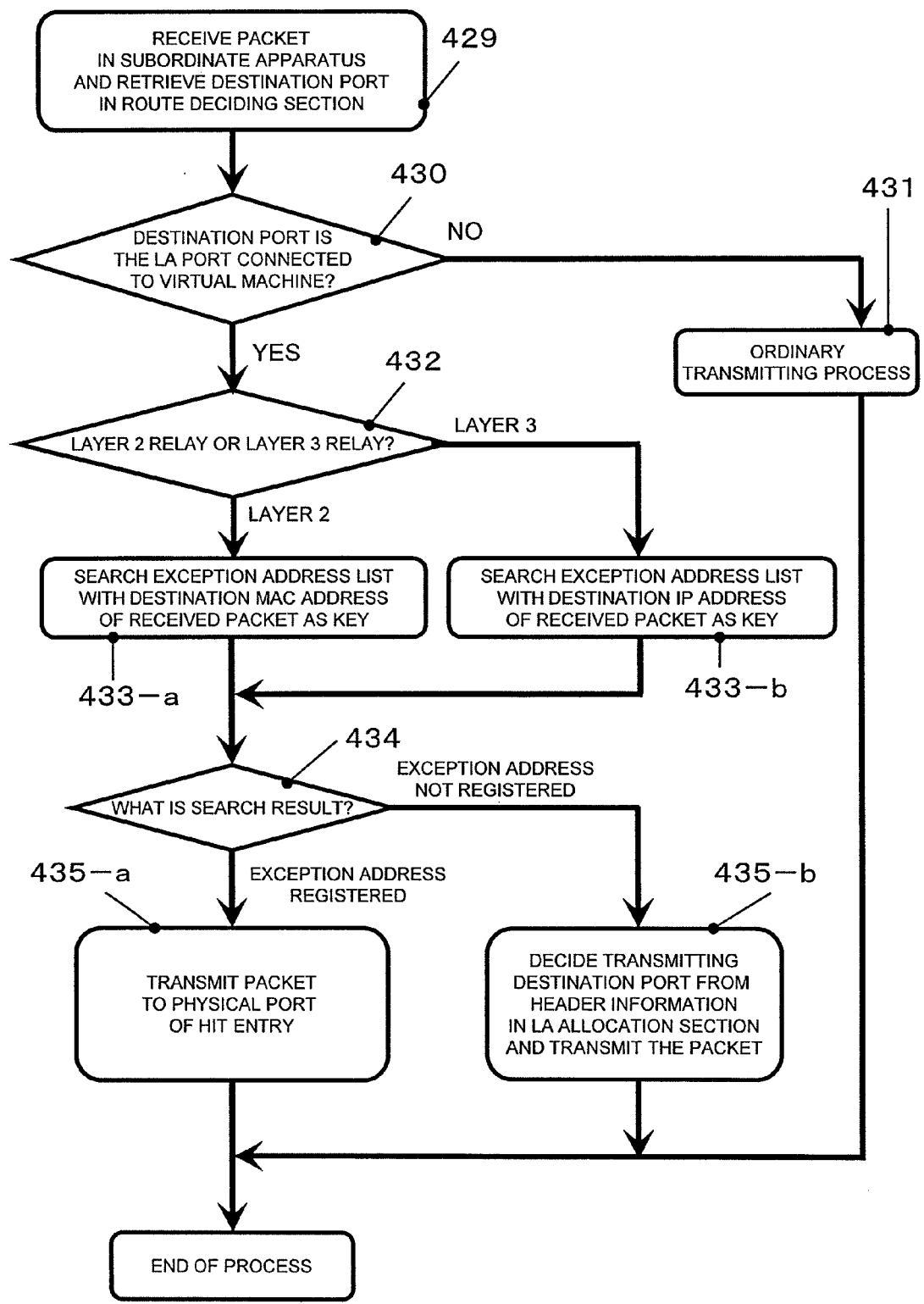
FIG. 33 is a flowchart showing the procedure of a packet relay process in the subordinate apparatus in the third example of the invention.

A packet relay process in the subordinate apparatus 119 in the configuration example of FIG. 28 will be described below along FIG. 33. In the third example, the layer 2 protocol uses the Ethernet II and the layer 3 protocol uses the IPv4. If a packet is transmitted from the terminal 203 to the apparatus (not shown) on the network connected to the network apparatus 201, the packet is received in the subordinate apparatus 119. The route deciding section 122 of the subordinate apparatus 119 receives an instruction of performing the packet receiving process from the forwarding plane 120. The route deciding section 122 searches the routing information 124, and decides the transmitting destination port (step 429). Then, the process branches depending on whether the transmitting destination port is the LA port connected to the virtual machine or not by referring to the LA information table 123 (step 430). In the case of the LA port connected to the virtual machine, the operation proceeds to step 432. In other cases (normal physical port, the LA port not connected to the virtual machine), the operation proceeds to step 431, where the exception address process is not performed but the ordinary packet relay process is performed. In the example of FIG. 28, the port of the unit spanning LA composed of the physical ports 218 and 219 is selected as the transmitting destination port, whereby the operation proceeds to step 432. Then, the process branches, depending on whether the packet is treated as the layer 2 relay or the layer 3 relay in the route deciding section 122 (step 432). In the case of the layer 2 relay, the subordinate apparatus 119 searches the LA exception table 132-2 with the transmitting destination MAC address of the received packet as the key (step 433-*a*). In the case of the layer 3 relay, the subordinate apparatus 119 searches the LA exception table 132-1 with the transmitting destination layer 3 address of the received packet as the key (step 433-*b*). The process branches, depending on the "exception address registered" or the "exception address not registered" from the search result of step 433-*a* or 433-*b* (step 434). In the case of the exception address registered, the subordinate apparatus 119 transmits the packet to the physical port as indicated in the entry in which its exception address is included, whereby the relay process is completed (step 435-*a*). In the case of the exception address not registered, the subordinate apparatus 119 instructs the LA allocation section 121 to perform the packet process, as in the first example, and the LA allocation section 121 performs the packet allocation using a specific algorithm based on the header information of the packet, whereby the relay process is completed.

C-4. Effects of the Example

In the third example, it is possible to decrease the LA relay packets communicated via the unit spanning LA between the virtual machine 100 and the subordinate apparatus 119 (encapsulated unit passing data packets communicated between the physical units to be relayed from the virtual machine to the other apparatus), as compared with the first example. Hence, it is possible to reduce the pressure on the band of the unit spanning LA line, which is the problem of the first example.

In the second and third examples, there is provided means for relieving the pressure on the band of the unit spanning LA line, which is the problem of the first example. One or both of the second and third examples may be combined with the first example.

D. Fourth Example

In a fourth example, for the network apparatus connected via the unit spanning LA to the virtual machine 100, a case in which an apparatus for processing the LA relay packet, like the subordinate apparatus 119, (hereinafter referred to as a subordinate apparatus with function) and an apparatus without a function of processing the LA relay packet (hereinafter referred to as a subordinate apparatus without function) are mixed will be described. In the case where the subordinate apparatus with function and the subordinate apparatus without function are mixed, if a unit-to-unit link fault occurs, the subordinate apparatus without function transmits the packet to the virtual machine 100, whereby when the packet needs to be treated as the unit passing data packet in the virtual machine 100, there is a problem that the relay process cannot be performed, because the subordinate apparatus without function does not have the function of treating the LA relay packet.

Thus, in the fourth example, when the unit-to-unit link fault occurs, if the packet needing the unit passing data packet process is transmitted from the subordinate apparatus without function to the virtual machine, the unit passing data packet is transmitted and received between the physical units using the unit spanning LA line via the subordinate apparatus with function.

D-1. Configuration of the Example

Figure 34:
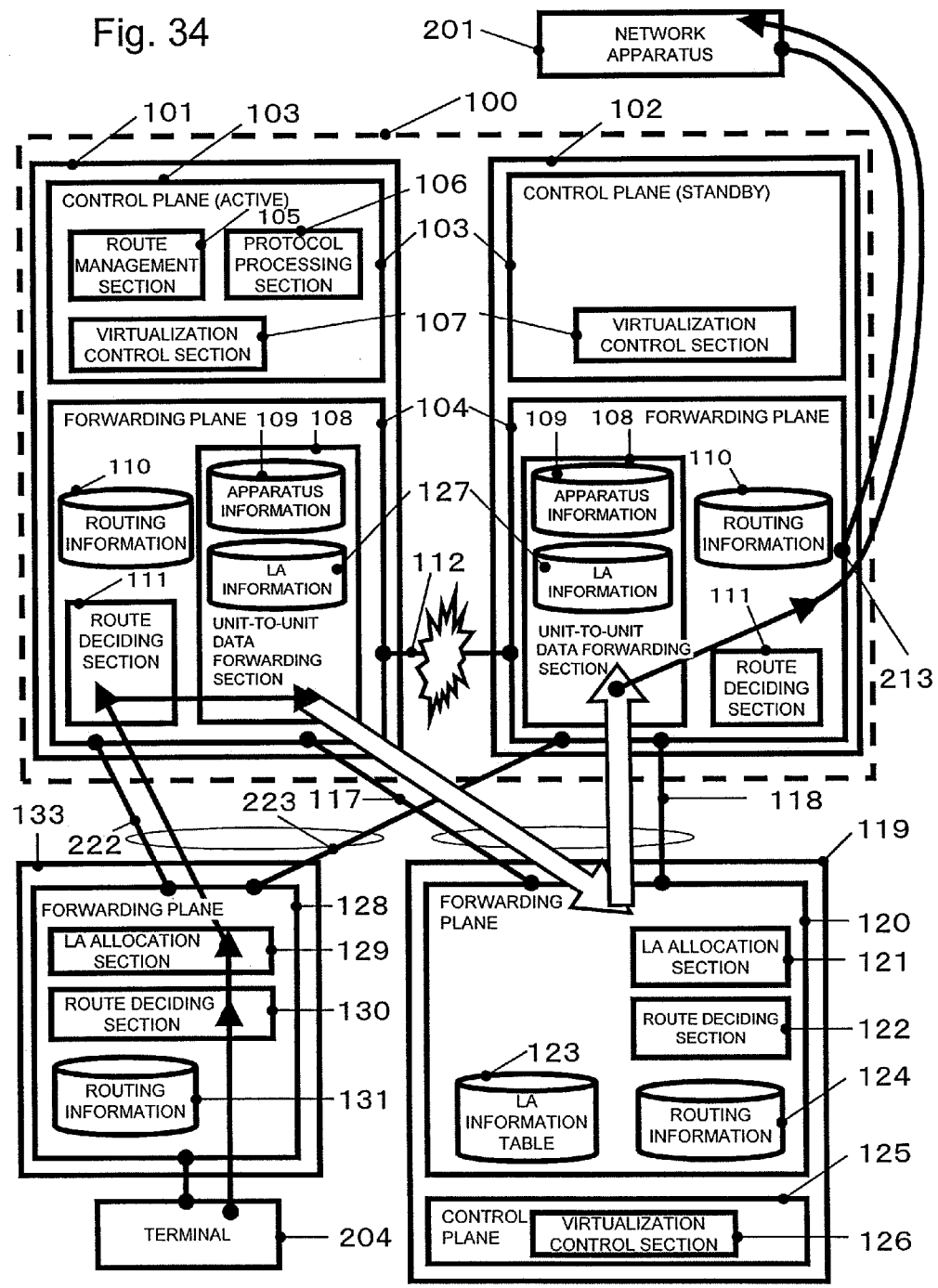
FIG. 34 is an explanatory view showing a schematic configuration in a fourth example of the invention.

FIG. 34 shows a schematic configuration of the fourth example. In addition to the configuration of the first example (see FIG. 1), an LA information table 127 is arranged on the unit-to-unit data forwarding section 104 of each of the physical units 101 and 102 in the fourth example. The LA information table 127 stores the information indicating whether the connection target is the subordinate apparatus with function or the subordinate apparatus without function for the unit spanning LA line on the virtual machine 100. The subordinate apparatus 119 is connected via the line 117 to the physical unit 101 and connected via the line 118 to the physical unit 102 to constitute the unit spanning LA line, as in the first example. The subordinate apparatus 119 is the subordinate apparatus with function having a function of replaying the LA relay packet. In addition, a subordinate apparatus 133 is connected to the virtual machine 100 in the fourth example. The subordinate apparatus 133 is connected via a line 222 to the physical unit 101 and connected via a line 223 to the physical unit 102 to constitute the unit spanning LA line. The subordinate apparatus 133 is the subordinate apparatus without function. The subordinate apparatus 133 has a forwarding plane 128, and has an LA allocation section 129, a route deciding section 130 and the routing information 131, like the subordinate apparatus 119. A terminal 204 is connected to the subordinate apparatus 133.

D-2. Operation when the Unit-to-Unit Link is Normal

In the fourth example, a data forwarding method when the unit-to-unit link 112 is normal is the same as in the first example. The subordinate apparatus without function 133 performs the same process as the relay process of the subordinate apparatus 119 as shown in FIG. 6.

FIG. 35 shows the information stored in the LA information table 127 of each physical unit 101, 102. The LA information table 127 has a physical port number field that is the identification number of each physical port on the virtual machine 100, a belonging physical unit field indicating in which physical unit the physical port exists, and an LA group number field indicating to which LA group the physical port belongs. Further, for every same LA group, there is provided a subordinate apparatus type field indicating whether the subordinate apparatus of connection target is the "subordinate apparatus with function" or the "subordinate apparatus without function".

The subordinate apparatus type field is set by communicating the packet between the virtualization control section 107 of the active physical unit and the virtualization control section 126 of the subordinate apparatus with function 119, for example, at the time of initialization of the virtual machine 100, in which the virtualization control section 126 notifies the virtualization control section 107 that the self-unit (subordinate apparatus 119) is the "subordinate apparatus with function". Also, the subordinate apparatus type field is updated from the "with function" to the "without function" by detecting a state where the LA relay packet cannot be relayed in an appropriate way, such as a state where the subordinate apparatus stops due to a fault, or a state where a fault occurs on one side of the unit spanning LA line. A detection method may rely on periodic keep-alive between the virtualization control section 107 of the physical unit 101, 102 and the subordinate apparatus with function 119, or switching at the moment of fault on the unit spanning LA line.

D-3. Operation when the Unit-to-Unit Link Fails

Figure 36:
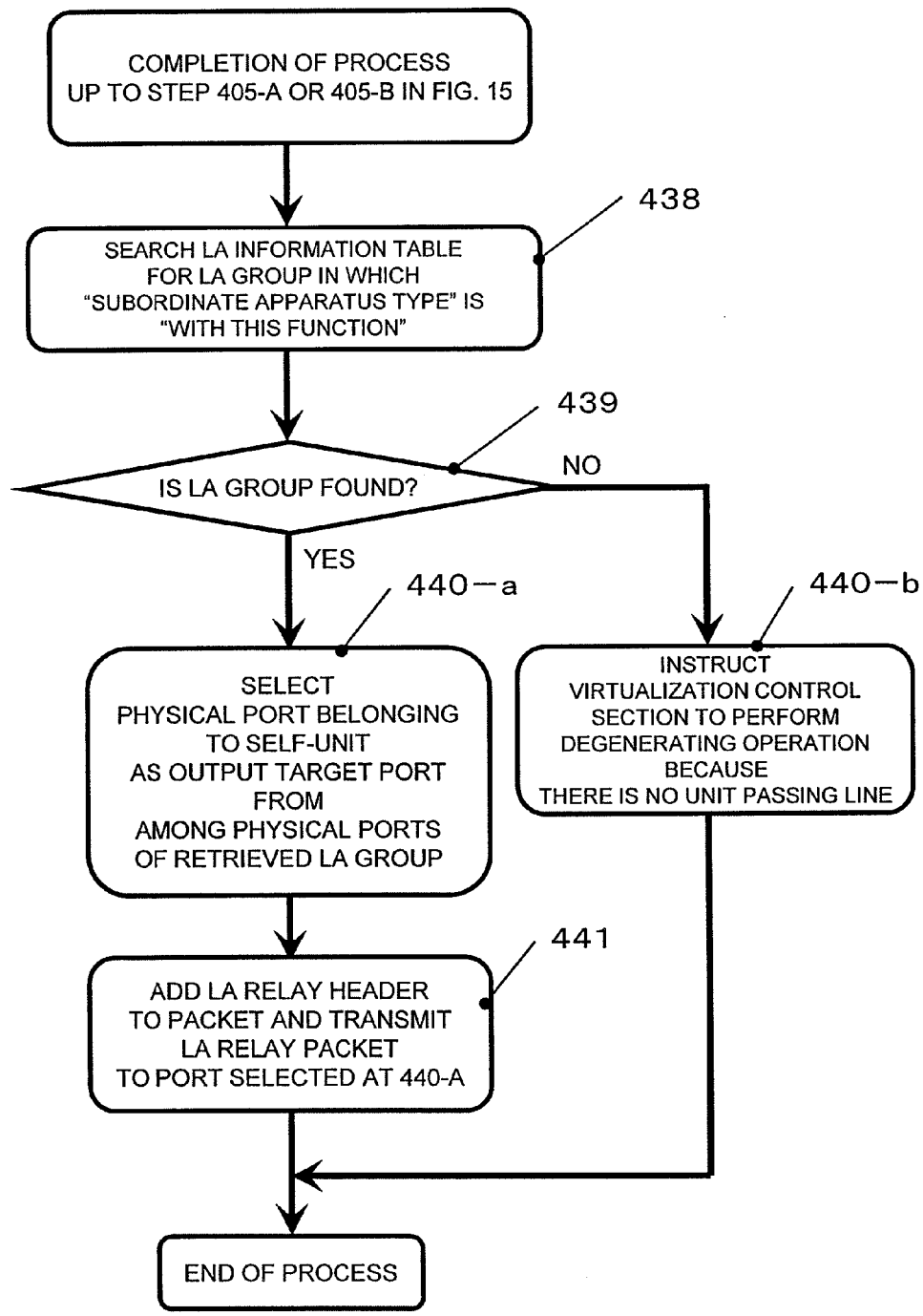
FIG. 36 is a flowchart showing the procedure of an LA relay packet transmitting process in the unit-to-unit data forwarding section in the fourth example of the invention.

In the fourth example, an LA relay packet transmitting process in the unit-to-unit data forwarding section 108 is performed by replacing the process following step 406 with the process shown in the flowchart of FIG. 36, after performing the process up to step 405-*a* or step 405-*b* in FIG. 15 in the first example.

In the fourth example, a relay process for transmitting the packet needing the unit passing data packet from the subordinate apparatus without function to the virtual machine when a unit-to-unit link fault occurs will be described below using an example of FIG. 34. FIG. 34 shows an example in which the packet is transmitted from the terminal 204 to an apparatus (not shown) on the network connected to the network apparatus 201. The packet transmitted from the terminal 204 is processed in the forwarding plane 128 of the subordinate apparatus without function 133 in the same way as shown in FIG. 6, and transmitted to any one of the physical units 101 and 102 by performing the LA allocation process. In this example, a case where the packet is allocated to the physical unit 101 will be described below. The forwarding plane 104 of the physical unit 101, receiving the packet, retrieves the output target port, based on the routing information 110, in the route deciding section 111, and determines that it is the port 213 of the physical unit 102. Since the port 213 is not present on the physical unit 101, the route deciding section 111 of the physical unit 101 instructs the unit-to-unit data forwarding section 108 of the self-unit to transmit the packet to the physical unit 102. In the unit-to-unit data forwarding section, the process up to step 405-*a* or step 405-*b* in FIG. 15 is performed, and subsequently, the process unique to the fourth example as shown in FIG. 36 is performed.

The unit-to-unit data forwarding section 108 of the physical unit 101 searches the LA information table 127 for the LA group number in which the subordinate apparatus type field is "with function" (step 438). The following process branches, depending on whether the LA group number is found or not (step 439). If not found, it is required to degenerate two physical units to one, because there is no subordinate apparatus with function. Therefore, the virtualization control section 107 instructs the execution of a degeneration operation. The degeneration operation may be performed through the same process in the recovery mode of non-patent document 1 (step 440-*b*). In the example of FIG. 34, the LA group number (e.g., 10) of the unit spanning LA composed of the lines 117 and 118 is obtained by performing the searching process of step 438. In this case, among the physical ports within the LA group, the physical port belonging to the self-unit (physical unit 101) becomes the port connected to the subordinate apparatus with function. In the example of FIG. 35, the port 1 applies. This port is selected as the port for transmitting the LA relay packet (step 440-*a*). Finally, the LA relay packet is outputted to the selected port (step 441). Through the above process, the LA relay packet arrives at the subordinate apparatus 119.

The following process in the subordinate apparatus 119 and the physical unit 102 is the same as in the first example.

D-4. Effects of the Example

In the fourth example, in combination with the first example, it is possible to maintain the packet forwarding from the subordinate apparatus without function, even when a fault of the unit-to-unit link occurs, in the environment where the subordinate apparatus with function and the subordinate apparatus without function are mixed. Thereby, if at least one of the apparatuses adjacent to the virtual machine has the function of the subordinate apparatus, the other network apparatuses without having the function of the subordinate apparatus can also make use of the forwarding capability corresponding to the physical units making up the virtual machine, whereby the flexible network configuration can be made.

E. Modification

The invention is not limited to the above examples, but may be carried out in various modes without departing from the spirit or scope of the invention.

(Omission of the Unit-to-Unit Link)

In the First to Fourth Examples as Described Above, the physical units are connected via the unit-to-unit link, and when the unit-to-unit link is normal, the virtualization control packet or the unit passing data packet is transmitted via the unit-to-unit link. However, using a method for communicating the virtualization control packet or unit passing data packet via the unit spanning LA as described in the first example, two physical units can be virtualized into one virtual machine by using the unit spanning LA line even in the system configuration without having the unit-to-unit link, such as when the unit-to-unit link cannot be prepared due to a reason on the facilities.

(Modified Configuration of the Virtual Machine)

Also, in the first to fourth examples as described above, the virtual machine is made up of two physical units. The invention is also applicable to the case where the virtual machine is made up of three or more physical units. For this purpose, for example, the field may be expanded to store a characteristic value (hereinafter referred to as a physical unit identifier) for identifying plural physical units in the transmitting source apparatus type 501 and the transmitting destination apparatus type 502 included in the frame format of the LA relay packet in each example, as shown in FIG. 12 in the first example. For example, in FIG. 13 of the first example, "0" is defined as the active system, and any other value than 0 may be assigned to the standby system of the other units. Also, for the system state of the connection target apparatus in FIG. 14, the physical unit identifier for use in the transmitting source apparatus type 501 and the transmitting destination apparatus type 502, not the value of active or standby, is stored. When the unit-to-unit link fails, if each physical unit is required to transmit the LA relay packet via the subordinate apparatus to the other physical unit, it is necessary that the physical unit identifier of the physical unit to which a transmitting source wants to transmit the data is designated in the transmitting destination apparatus type of the LA relay header, whereby it is possible to relay the packet to the physical unit intended by the transmitting source in the subordinate apparatus. A method for deciding the physical unit identifier assigned to each physical unit may be statically defined by configuration, or dynamically settled by communication between the virtualization control sections of the physical units. In either case of static or dynamic determination, if the physical unit identifier is decided, each physical unit learns the physical unit identifier of the other physical unit, and decides which physical unit identifier is for the active system.

(Virtualization of the Subordinate Apparatus)

The subordinate apparatus in the first to fourth examples as described above is also applicable to the virtual machine made up of plural physical units.

Figure 37:
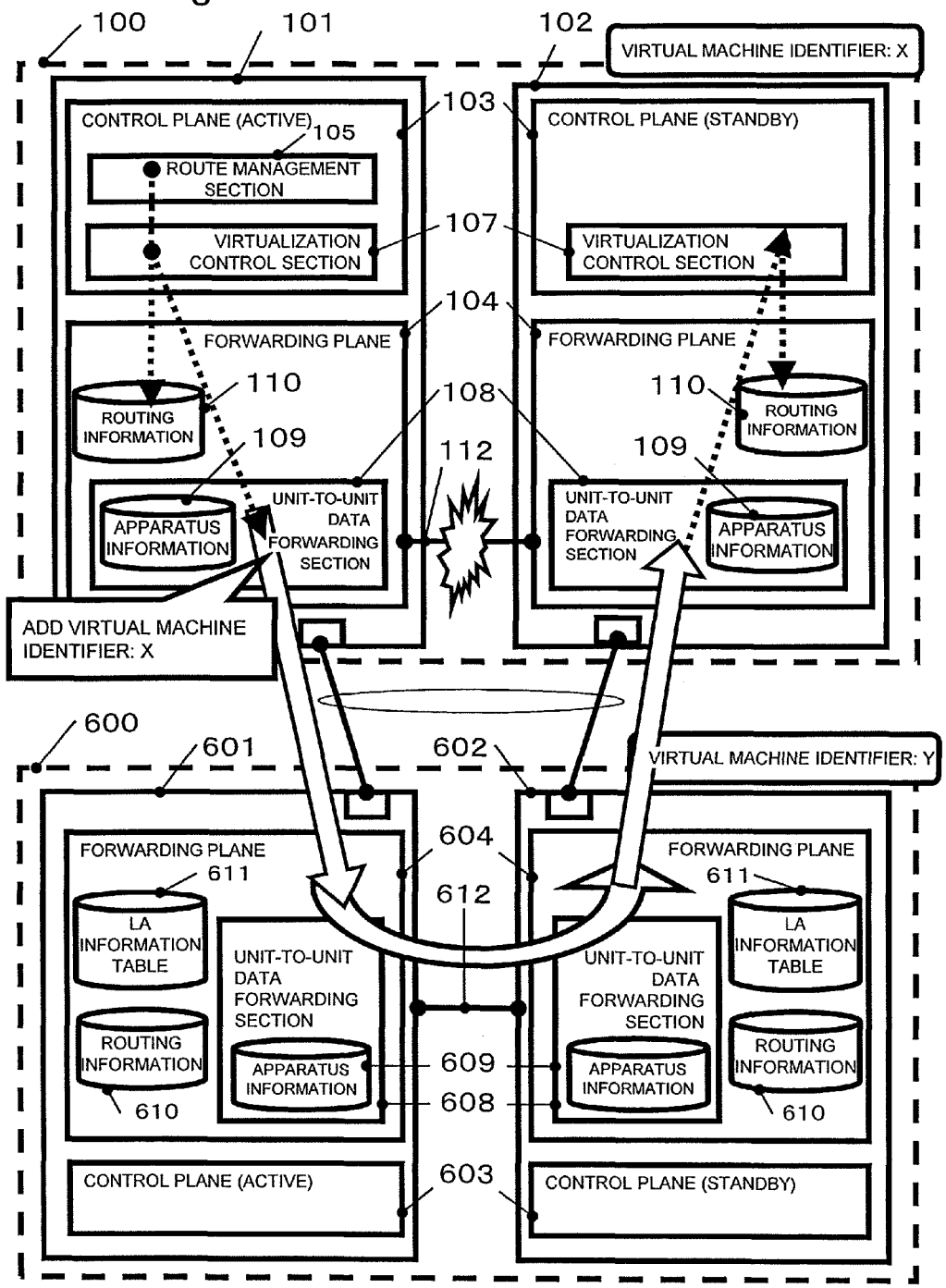
FIG. 37 is a system configuration view of a modification in which the subordinate apparatus is composed of the virtual machine.

FIG. 37 shows an example of the system configuration. For example, the subordinate apparatus connected to the virtual machine 100 is a virtual machine 600 made up of the physical units 601 and 602 in the configuration of the first example as shown in FIG. 1. Each of the physical units 601 and 602, like the physical units 101 and 102, includes a control plane 603 and a forwarding plane 604. The forwarding plane 604 has a unit-to-unit data forwarding section 608, an apparatus information table 609 and the routing information 610. In this case, if the virtual machine 600 receives an LA relay packet transmitted from the physical unit on the virtual machine 100, there is a problem that it is misrecognized as the virtualization control packet or apparatus passing data for the self-unit, so that the improper route synchronization or false forwarding may occur. Thus, the virtual machine is provided with the same LA relay packet relay function as the subordinate apparatus, and further a characteristic value (hereinafter referred to as a virtual machine identifier) for identifying the virtual machine is assigned to each virtual machine, whereby it is possible to solve the above problem. For example, in the first example, the virtual machine identifier assigned to the virtual machine to which the self-unit belongs is stored in the frame format of the LA relay packet to be transmitted in the LA relay packet transmitting process as shown in FIG. 15. Each virtual machine performs the receiving process for the LA relay packet as shown in FIG. 16, if the virtual machine identifier included in the header and the virtual machine identifier of the self-unit are matched in receiving the LA relay packet. If there is not match with its own virtual machine identifier, it operates as the subordinate apparatus to perform the relay process for the LA relay packet as shown in FIG. 17. To perform the process as shown in FIG. 17, the LA information table 611 is arranged in each of the physical units 601 and 602, to store the same information as the LA information table 123 on the subordinate apparatus 119 in the first example. With the above method, the virtual machine can operate as the subordinate apparatus.

(Application to the Redundancy System)

The physical unit in the first to fourth examples as described above is also applicable to the case where it is connected to not only the network system in which two or more apparatuses virtually operate as one apparatus, like the virtual machine, but also the network system (hereinafter a redundancy system) in which each apparatus independently operates by making the redundancy control over two or more network apparatuses. As an example, a case where the subordinate apparatus and two or more network apparatuses making up the redundancy system are connected via the physical lines, each physical line being operated as the unit spanning LA, will be described below. In the redundancy system, when a control packet for keep-alive is transmitted and received between the network apparatuses, the control packet can be relayed via the unit spanning LA in the subordinate apparatus through the process of the subordinate apparatus in the first example. Thereby, in the redundancy system using the private line to communicate the control packet, it is possible to continue to transmit or receive the control packet via the unit spanning LA, even when a fault occurs in the private line. Also, the operation is enabled without preparing the private line. Further, the packet destined to the specific address can be transmitted to the specific network apparatus on the redundancy system in accordance with an instruction from the redundancy system by performing the process of the subordinate apparatus in the examples 2 and 3. Thereby, when the packet is relayed to the apparatus connected to the specific network apparatus only, the procedure for passing the packet between the network apparatuses on the redundancy system can be omitted, and the packet can be relayed in the shortest route.

(Configuration Example of the Subordinate Apparatus)

The above-mentioned subordinate apparatus is a network apparatus connected to a network system via a link aggregation and transmitting a packet to the network system via the link aggregation, and can comprise a forwarding plane that, in a case where information indicating whether or not a link aggregation line is to be regarded as individual physical lines and information indicating a physical line to which the packet is output in the link aggregation line are included in a header information of the packet transmitted from the network system, regards the link aggregation line as the individual physical lines in accordance with the information and transmits the packet using the physical line in a designated link aggregation line.

Moreover, the above-mentioned subordinate apparatus is a network apparatus connected to a network system via a link aggregation and transmitting a packet to the network system via the link aggregation, and can comprise an exception address table section for storing, when receiving an arbitrary network address and information of a transmitting destination line indicating which physical line of the link aggregation is used to transmit the packet with the arbitrary network address as the transmitting destination from the network system, an entry in which the network address and the information of the transmitting destination line are associated; and a forwarding plane searching the exception address table section when receiving the packet and transmitting received packet to the physical line according to the information of the transmitting destination line in the entry, in a case of being found the entry of which the transmitting destination network address is matched.

In each example as described above, each table may be stored in an appropriate storage section. Also, each table may be stored in a storage area in any appropriate form other than the table organization.

Industrial Applicability

The invention is applicable to a network system in which plural network apparatuses are virtually operated as one network apparatus, for example.

What is claimed is:

1. A network system comprising: a first physical apparatus; a second physical apparatus connected to the first physical apparatus; and a subordinate apparatus being a network apparatus, connected to the first physical apparatus and the second physical apparatus via physical lines, the physical lines constituting an apparatus spanning link aggregation that is a virtual line integrating the physical lines, and, communicating to a virtual machine provided by the first physical apparatus and the second physical apparatus via at least one of the physical lines; wherein each of the first physical apparatus and the second physical apparatus for providing a virtual machine for a network includes:

an apparatus-to-apparatus data forwarding section adding identification information of a destination physical apparatus for specifying the physical apparatus of transmitting destination to a virtualization packet, and transmitting the virtualization packet to the subordinate apparatus via any of the physical lines constituting the apparatus spanning link aggregation; and wherein the subordinate apparatus includes:

a link aggregation information table storing, with being associated, identification information of a physical apparatus which is the first physical apparatus or the second physical apparatus, and identification information of the physical line which is connected to the physical apparatus and constitutes the apparatus spanning link aggregation; and a forwarding section searching the link aggregation information table, based on the identification information of the destination physical apparatus added to the virtualization packet, for the virtualization packet received from either the first or second physical apparatus, specifying a corresponding physical line in the apparatus spanning link aggregation, and outputting the virtualization packet via specified physical line to either the first or second physical apparatus which is a transmission destination, wherein the forwarding section that, in a case where information indicating whether or not a link aggregation line is to be regarded as individual physical lines and information indicating a physical line to which the packet is output in the link aggregation line are included in a header information of the packet transmitted from the virtual machine regards the link aggregation line as the individual physical lines in accordance with the information and transmits the packet using the physical line in a designated link aggregation line.

2. The network system according to claim 1, wherein the virtual machine has an apparatus-to-apparatus link for exchanging the virtualization packet between the first physical apparatus and the second physical apparatus, the virtualization packet including a virtualization control packet for virtualization control and a data packet transmitted and received between the first and second physical apparatuses; and the apparatus-to-apparatus data forwarding section, when a fault occurs in the apparatus-to-apparatus link, adds the identification information of the destination physical apparatus for specifying the physical apparatus of transmitting destination to the virtualization packet and, transmits the virtualization packet to the subordinate apparatus via any of the physical lines constituting the apparatus spanning link aggregation.

3. The network system according to claim 1, wherein
each of the first physical apparatus and the second physical apparatus has a control section,
wherein one control section is active to perform a route control and/or a network protocol process, and the other control section is standby not to perform the route control and/or the network protocol process, and
the identification information of the physical apparatus is system information indicating that the control section of either the first physical apparatus or the second physical apparatus is active or standby.

4. The network system according to claim 1, wherein the subordinate apparatus further comprises
a virtualization control section collecting identification information of the physical apparatus that is information for identifying the physical apparatus from the first physical apparatus and the second physical apparatus via the physical lines respectively, and storing, with being associated, identification information of the physical line and collected information of the physical apparatus in the link aggregation information table respectively.

5. The network system according to claim 1, wherein
the subordinate apparatus is virtually one network apparatus constituted by at least a third physical apparatus and a fourth physical apparatus, and a second virtual machine having a second apparatus-to-apparatus link for exchanging the packet between third and fourth physical apparatuses,
a virtual machine identifier is uniquely assigned to each of the virtual machine and the second virtual machine,
the apparatus-to-apparatus data forwarding section of each of the first physical apparatus and second physical apparatus transmits the virtualization packet by adding the virtual machine identifier of the virtual machine, to which a self-unit belongs, to the virtualization packet when transmitting the virtualization packet, and
the forwarding section of the subordinate apparatus, when receiving the virtualization packet, outputs the virtualization packet to the physical line specified by referring to the link aggregation information table, in a case where the virtual machine identifier added to the virtualization packet is unmatched with the virtual machine identifier of the second virtual machine to which the self-unit belongs.

6. The network system according to claim 5, wherein
the subordinate apparatus, in which the virtualization packet is forwarded from the third physical apparatus receiving the virtualization packet via the second apparatus-to-apparatus link to the fourth physical apparatus, outputs the virtualization packet to specified physical line which is connected to the fourth physical apparatus.

7. The network system according to claim 1, wherein
among the first physical apparatus and the second physical apparatus, the first physical apparatus performing a receiving process for the packet destined to the virtual machine further comprises a virtualization control section transmitting address information of the virtual machine to the subordinate apparatus,
the subordinate apparatus further comprises a virtual machine address information table storing the address information received from the virtualization control section of the virtual machine, and
the forwarding section specifies the physical line connected to the first physical apparatus by referring to the link aggregation information table, and outputs received packet to specified physical line, in a case where address information matched with a transmitting destination address of the packet is found by referring to the virtual machine address information table when receiving the packet.

8. The network system according to claim 1, wherein
the subordinate apparatus further comprises a link aggregation exception address table storing, with being associated, transmitting destination address information of a data packet and an identification information of the physical line specified by referring the link aggregation information table, in a case where a data packet relayed between the first physical apparatus and the second physical apparatus is included in the virtualization packet when receiving the virtualization packet from either the first physical apparatus or the second physical apparatus,
wherein the forwarding section searches the link aggregation exception address table to check whether or not the transmitting destination address information of the packet is stored in the link aggregation exception address table, in a case where an output destination is the apparatus spanning link aggregation line connected to the virtual machine in the route search at a time of receiving the packet, and transmits the packet in accordance with identification information of the corresponding physical line, if stored.

9. The network system according to claim 1, further comprising
a second subordinate apparatus that is part of the network apparatus connected to the virtual machine, and does not have a relay function of the virtualization packet achieved by the link aggregation information table and the forwarding section,
wherein each of the first physical apparatus and second physical apparatus has a link aggregation information table section storing, with being associated, a link aggregation identifier for identifying the apparatus spanning link aggregation and information of subordinate apparatus type indicating whether or not the apparatus connected by the apparatus spanning link aggregation has the relay function, and
the apparatus-to-apparatus data forwarding section determines the link aggregation identifier connected to the subordinate apparatus having the relay function by referring to the link aggregation information table, and outputs the packet to the physical line constituting the link aggregation, in a case where one of the first physical apparatus and second physical apparatus transmits the packet received from the second subordinate apparatus to the other of the first physical apparatus and second physical apparatus.

10. The network system according to claim 9, wherein
the first physical apparatus receives information indicating that either the first or second subordinate apparatus has the relay function from either the first or second subordinate apparatus, and stores the information in the link aggregation information table section.

11. The network system according to claim 1, wherein
the identification information of the physical apparatus for identifying the first physical apparatus and the second physical apparatus is predetermined, wherein the first physical apparatus and second physical apparatus further comprises a virtualization control section learning the identification information of the physical apparatus except for the self-unit by transmitting and receiving the virtualization packet between the first physical apparatus and the second physical apparatus, and an apparatus information table holding the identification information of the physical apparatus of the self-unit.

12. The network system according to claim 11, wherein the apparatus-to-apparatus data forwarding section of the second physical apparatus performs a receiving process for the virtualization packet in a case where the identification information of the physical apparatus in the apparatus information table and the identification information of the physical apparatus of transmitting destination in the virtualization packet are matched when receiving the virtualization packet from the subordinate apparatus.

* * * * *